United States Patent
Huttenlocher et al.

(10) Patent No.: US 6,249,604 B1
(45) Date of Patent: Jun. 19, 2001

(54) METHOD FOR DETERMINING BOUNDARIES OF WORDS IN TEXT

(75) Inventors: Daniel P. Huttenlocher; Peter C. Wayner; Michael J. Hopcroft, all of Ithaca, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/196,028

(22) Filed: Feb. 14, 1994

Related U.S. Application Data

(63) Continuation of application No. 07/794,392, filed on Nov. 19, 1991, now Pat. No. 5,321,770.

(51) Int. Cl.[7] ................................................. G06K 9/80
(52) U.S. Cl. ........................ 382/174; 382/177; 382/289
(58) Field of Search .............................. 382/9, 10, 11, 382/12, 16, 27, 25, 28, 46, 31, 172, 174, 177, 181, 193, 190, 199, 203, 206, 210, 296, 229, 289

(56) References Cited

U.S. PATENT DOCUMENTS

| | | | |
|---|---|---|---|
| 4,377,803 | * 3/1983 | Lotspiech et al. | 382/9 |
| 4,558,461 | * 12/1985 | Sohlang | 382/9 |
| 4,731,857 | * 3/1988 | Tappert | 382/9 |
| 4,741,045 | * 4/1988 | Denning | 382/9 |
| 4,918,740 | * 4/1990 | Ross | 382/9 |
| 5,048,109 | * 9/1991 | Bloomberg et al. | 382/50 |
| 5,054,091 | * 10/1991 | Tanaka et al. | 382/9 |
| 5,187,753 | * 2/1993 | Bloomberg et al. | 382/46 |
| 5,307,422 | * 4/1994 | Wang | 382/9 |

FOREIGN PATENT DOCUMENTS

| | | |
|---|---|---|
| 0332471 | 9/1989 | (EP) . |
| 0334472 | 9/1989 | (EP) . |
| 39-26510 | 11/1964 | (JP) . |

OTHER PUBLICATIONS

T. E. Chefalas, G. J. Liebman, C. C. Tappert, Optimal Recognition of Baseline–Dependent Characters in Online Handwriting Recognition, IBM Technical Disclosure Bulletin, vol. 34, No. 3, Aug. 1991.

Y. Sato and K. Kogure, Online Signature Verification Based on Shape, Motion, and Writing Pressure, Proceedings–6th International Conference on Pattern Recognition, Oct. 19, 1982, pp. 823–826.

N.F. Brickman, W.S. Rosenbaum, Word Autocorrelation Redundancy Match (Warm) Technology, IBM Journal of Research & Development, vol. 26, No. 6, Nov. 1982.

T. Nakano, S. Yamamoto, N. Takeda, A New Recognition Method for Stamped and Painted Alphanumerals, Systems and Computers in Japan, vol. 21, No. 4, 1990.

(List continued on next page.)

*Primary Examiner*—Jon Chang

(57) ABSTRACT

A method for determining the boundaries of a symbol or word string within an image, including the steps of determining page orientation, isolating symbol strings from adjacent symbol strings, establishing a set of boundaries or references with respect to which measurements about, or further processing of, the symbol string may be made.

15 Claims, 31 Drawing Sheets

OTHER PUBLICATIONS

Y. Fujimoto, S. Kadota, S. Hayashi, M. Yamamoto, S. Yajima, M. Yasuda, Recgnition of Handprinted Characters by Nonlinear Elastic Matching, Proceedings of the International Joint Conference on Pattern Recognition, Nov. 8, 1976, pp. 113–118.

S. N. Srihari, G. W. Zack, Document Image Analysis, International Association of Pattern Recognition–8th International Conference on Pattern Recognition, Oct. 27, 1986, p. 435, Section 2.1.

O. Nakamura, N. Okamoto, T. Niwata, T. Minami, A Symbol Segmentation Algorithm from Free Format Documents, Systems, Computers, Controls (Scripta Publ. Co., Silver Spring, MD), Mar.–Apr. 1983, vol. 14 No. 2, Section 3.

R.G. Casey, Coarse–Fine OCR Segmentation, IBM Technical Disclosure Bulletin, vol. 23, No. 8, Jan. 1981.

K. Yokosawa, "Human–Based Character String Image Retrieval From Textural Images" presented at the 1989 IEEE International Conference on Systems, Man and Cybernetics; vol. 3, pp. 1068–1069 No. 14–17, 1989.

R. Bozinovic, "Off–Line Cursive Script Word Recognition," *IEEE Transactions on Pattern Analysis and Machine Intelligence,* vol. 11, Isue 1 pp 68–83, Jan. 1989.

\* cited by examiner

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

*FIG. 2*

A practitioner may not solicit professional employment from a prospective client with whom the practitioner has no family or prior professional relationship, by mail, in-person or otherwise, when a significant motive for the practitioner's doing so is the practitioner's pecuniary gain under circumstances evidencing undue influence, in-

FIG. 3

FIG. 15A
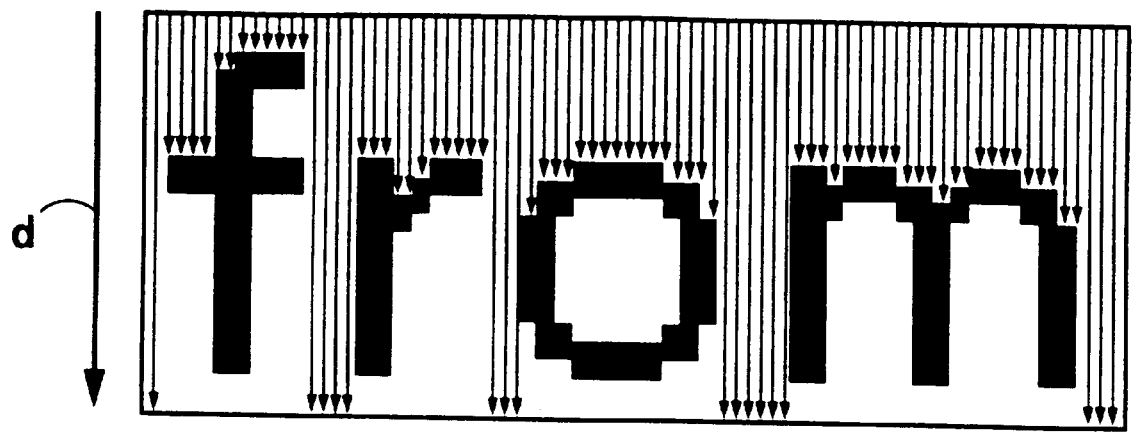
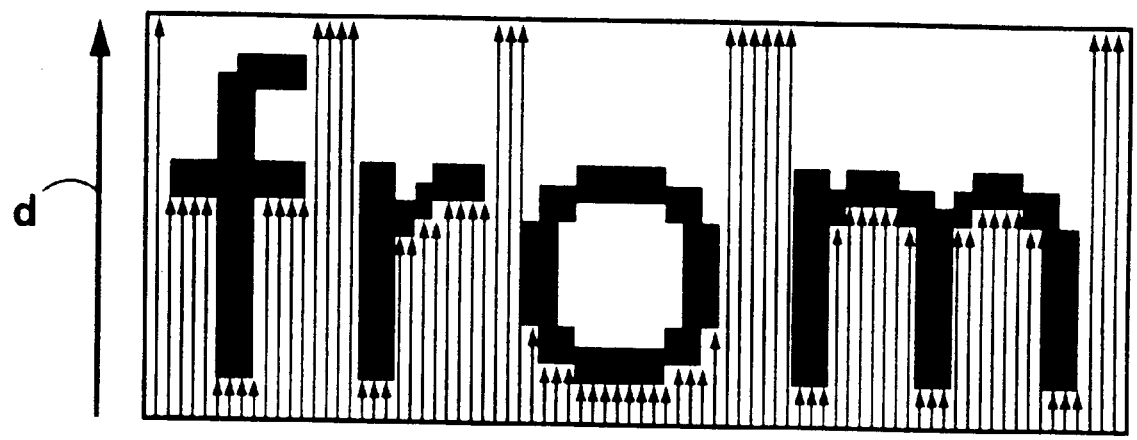
FIG. 15B

FIG. 18A
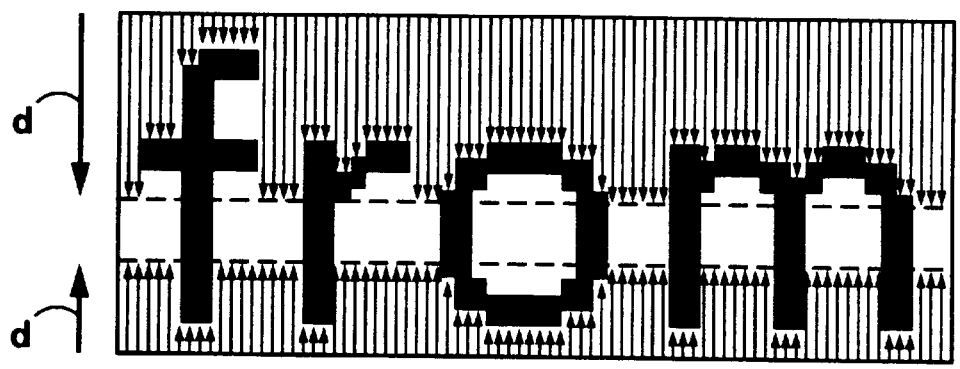
FIG. 18B
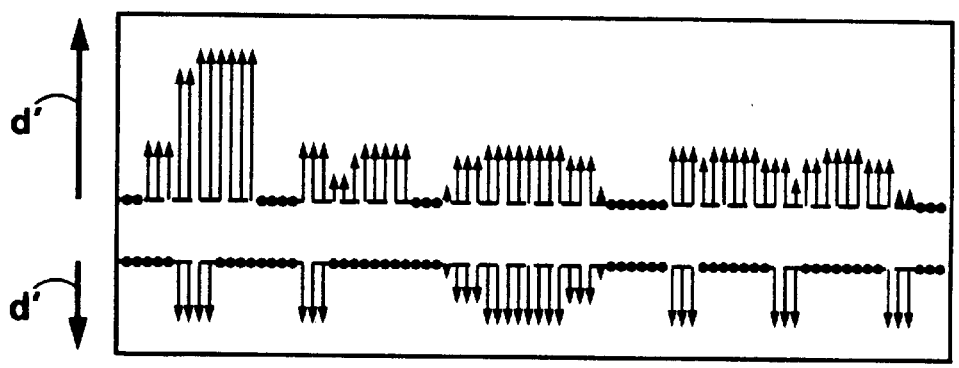
FIG. 18C
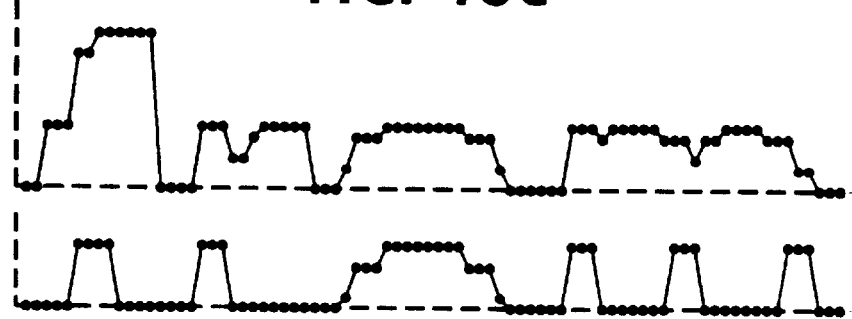
FIG. 18D

FIG. 19A
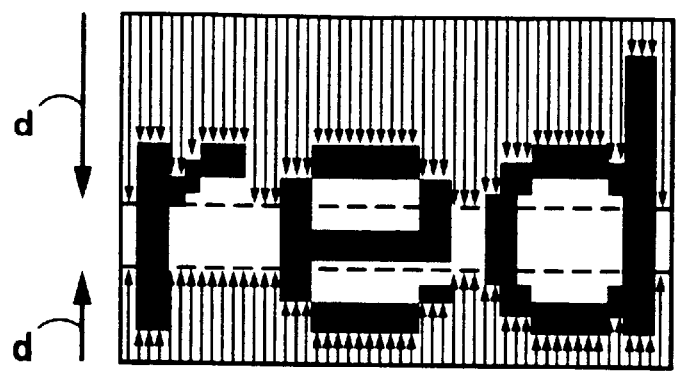
FIG. 19B
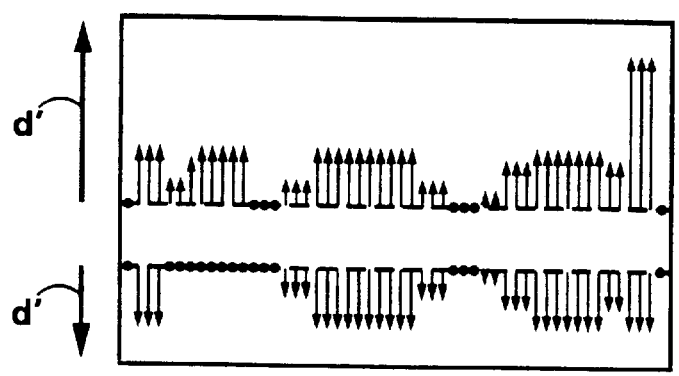
FIG. 19C
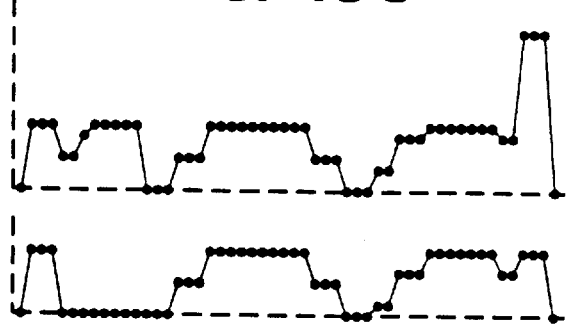
FIG. 19D

METHOD FOR DETERMINING BOUNDARIES OF WORDS IN TEXT

This is a continuation, of application Ser. No. 07/794,392, filed Nov. 19, 1991 now U.S. Pat. No. 5,321,770.

This invention relates to a method of determining the boundaries of text or character strings represented in an array of image data by shape, without a requirement for individually detecting and/or identifying the character or characters making up the strings.

CROSS REFERENCE

The following related applications are hereby incorporated by reference for their teachings:

"Coarse and Fine Skew Measurement," Wayner et al., Ser. No. 07/737,863, filed Jul. 30, 1991 now abandoned.

"Optical Word Recognition by Examination of Word Shape," Huttenlocher et al., Ser. No. 07/796,119, filed Nov. 19, 1991 now abandoned.

"Method for Comparing Word Shapes," Huttenlocher et al., Ser. No. 07/795,169, filed Nov. 19,1991 now abandoned.

"A Method of Deriving Wordshapes for Subsequent Comparison," Huttenlocher et al., Ser. No. 07/794,391, filed Nov. 19, 1991 now abandoned.

INCORPORATION BY REFERENCE

The article "Performance Tradeoffs in Dynamic Time Warping Algorithms for Isolated Word Recognition", by Myers, Rabiner, and Rosenberg, IEEE Transactions on Acoustics, Speech, and Signal Processing, Vol. ASSP-28, No. 6, December 1980, and the book, "Time Warps, String Edits, and Macromolecules: The Theory and Practice of Sequence Comparison", by Sankoff and Kruskal, Addison-Wesley Publishing Company, Inc., Reading, Massachusetts, 1983, Chapters 1 and 4, are specifically incorporated herein by reference for their teachings.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

MICROFICHE APPENDIX

An appendix comprising 3 microfiche having a total of 274 frames thereon is included as part of this application.

BACKGROUND OF THE INVENTION

Text in electronically encoded documents (electronic documents) tends to be found in either of two formats, each distinct from the other In a first format, the text may be in a bitmap format, in which text is defined only in terms of an array of image data or pixels, essentially indistinguishable from adjacent images which are similarly represented. In this format, text is generally incapable of being subjected to processing by a computer based on textual content alone. In a second format, hereinafter referred to as a character code format, the text is represented as a string of character codes (e.g. ASCII code). In the character code format, the image or bitmap of the text is not available.

Conversion from bitmap to character code format using an optical character recognition (OCR) process carries a significant cost in terms of time and processing effort. Each bitmap of a character must be distinguished from its neighbors, its appearance analyzed, and in a decision making process, identified as a distinct character in a predetermined set of characters. For example, U.S. Pat. No. 4,864,628 to Scott discloses a method for reading data which circumnavigates a character image. Data representative of the periphery of the character is read to produce a set of character parameters which are then used to compare the character against a set of reference parameters and identify the character. U.S. Pat. No. 4,326,190 to Borland et al. teaches a character feature detection system for reading alphanumeric characters. A digitized binary image is used, characters images are traced from boundary points to boundary points, wherein the transitions are are defined by one of eight equally divergent vectors. Character features a subsequently extracted from the vector data to form a feature set. The feature set is then analyzed to form a set of secondary features which are used to identify the character. U.S. Pat. No. 4,813,078 to Fujiwara et al. discloses a character recognition apparatus employing a similar process, where picture change points are identified and accumulated according to direction and background density, and are used to enable more accurate identification of characters which are generally erroneously recognized. Furthermore, U.S. Pat. No. 4,833,721 to Okutomi et al. teaches a similar system, operating on character outlines, which may be employed as a man/machine interface for an electronic apparatus.

Additional references which describe alternative methods and apparatus for identification of characters within a digitized image are: U.S. Pat. No. 3,755,780 to Sammon et al. teaches a method for recognizing characters by the number, position and shape of alternating contour convexities as viewed from two sides of the character; U.S. Pat. No. 3,899,771 to Saraga et al., which teaches the use of linear traverse employing shifted edge lines for character recognition; U.S. Pat. No. 4,817,166 to Gonzales et al., which teaches the application of character recognition techniques in an apparatus for reading a license plate which includes a character alignment section and a correction section; and U.S. Pat. No. 4,566,128 to Araki, which discloses a method for compressing character image data using a divided character image to recognize and classify contours, enabling the compressed storage of the character image as a group of closed-loop line segments. In addition, U.S. Pat. No. 4,956,869 to Miyatake et al. suggests a a more efficient method for tracing contour lines to prepare contour coordinates of a figure within an image consisting of a plurality of lines.

When the electronic document has been derived by scanning an original, however, image quality and noise in its reproduction contribute to uncertainty in the actual appearance of the bitmap. A degraded bitmap appearance may be caused by a original document of poor quality, by scanning error, or by similar factors affecting the digitized representation of the image. Therefore, the decision process employed in identifying a character has an inherent uncertainty about it. A particular problem in this regard is the tendency of characters in text to blur, or merge. Most character identifying processes commence with an assumption that a character is an independent set of connected pixels. When this assumption fails, due to the quality of the input image, character identification also fails. A variety of attempts have been made to improve character detection. U.S. Pat. No. 4,926,490 to Mano discloses a method and apparatus for recognizing characters on a document wherein characters of a skewed document are recognized. A rectangle is created around each character image, oriented with the detection orientation rather than the image orientation, and position data for each rectangle is stored in a table. The rectangle is created by detecting a character's outline. U.S. Pat. No. 4,558,461 to Schlang discloses a text line bounding system wherein skewed text is adjusted by analyzing vertical patches of a document. After the skew has been determined, each text line is bounded by determining a top, bottom, left, and right boundary of the text line. U.S. Pat. No. 3,295,105 to Gray et al. discloses a scan controller for normalizing a character in a character recognition apparatus wherein a character is analyzed by determining certain character characteristics including top, bottom, right and left character boundaries. U.S. Pat. No. 4,918,740 to Ross discloses a processing means for use in an optical character recognition system wherein sub-line information is used to analyze a character and identify it. U.S. Pat. No. 4,558,461 to Schlang suggests a text line bounding system for nonmechanically adjusting for skewed text in scanned text. The skew angle of the text is then established, following which the-text lines are statistically bounded. The actual text data is then rotated according to the orientation established for conventional processing. U.S. Pat. No. 4,809,344 to Peppers et al. teaches preprocessing of character recognition so as to obtain data necessary for character recognition. Page segmentation is performed by simultaneously extracting a plurality of features, separation between lines, separation between characters, and separation between the lines and the characters are simultaneously performed, and a calculation time for normalizing the separated individual characters can be reduced, thereby performing preprocessing required for character recognition systematically at high speed.

OCR methods have sought to improve reliability by use of dictionary word verification methods, such as described in U.S. Pat. No. 4,010,445 to Hoshino. However, the underlying problem of accurate character detection of each character in a character string remains. The article "F6365 Japanese Document Reader" Fujitsu Sci. Tech. J., 26, 3, pp. 224–233 (October 1990) shows a character reader using the steps of block extraction, skew adjustment, block division, adjacent character segmentation, line extractions, and character recognition by pattern matching, with dictionary checking, and comparison.

It might be desirable, to identify a set of characters forming a word or character string as such, as shown, for example, in U.S. Pat. No. 2,905,927 to Reed, in which for a text string, a set of three scans across the text, parallel to its reading orientation are employed, each scan deriving information about transitions from black to white across the scan. When values derived from the three scans are reviewed, the information derived from the combination of three scans forms a unique identifier for a word that may then be compared to preset values for identification purposes. Two problems are noted with this method, first, that the image information or bitmap is lost in the conversion, and secondly, the process is rather gross in nature and depends heavily upon the uniform nature of the character in the image scanned. Loss of the image bitmap is a characteristic of the conversion of a bitmap containing textual information to representative character codes. U.S. Pat. No. 4,155,072 to Kawa suggests a similar arrangement, operable to produce a set of values representative of the leading and trailing edges of the character. From this information a quadratic correlation function is used for comparison to standard character patterns.

In addition to an OCR system operating on printed or typed textual images, numerous references deal with recognition of handwritten text which has been converted into an electronic representation. U.S. Pat. No. 4,731,857 to Tappert shows processing a word with the segmentation and recognition steps combined into an overall scheme. This is accomplished by a three step procedure. First, potential or trail segmentation points are derived. Second, all combinations of the segments that could reasonably be a character are sent to a character recognizor to obtain ranked choices and corresponding scores. Finally, the recognition results are sorted and combined so that the character sequences having the best cumulative scores are obtained as the best word choices. U.S. Pat. No. 4,764,972 to Yoshida et al. suggests a recognition system for recognizing a plurality of handwritten characters. A first memory is used to store isolated characters, and a second memory is used to store information, including interstroke character information, for connecting isolated characters. Finally, U.S. Pat. No. 4,933,977 to Ohnishi et al. discloses a method for identifying a plurality of handwritten connected figures, including identifying and prioritizing branches of the connected figures. Branches having the lowest priority within a recognition block are erased until a recognizable figure is obtained. From the recognition block extends a second block which is analyzed in the same fashion until a second figure is recognized.

The choice of entire words as the basic unit of recognition, has also been considered in signature recognition, where no attempt is made to maintain characters as having separate identities, and is suggested by U.S. Pat. No. 3,133,266 to Frishkopf, which still relies on subsequent feature identification methods for identifying characteristics of the image of the character. Signature recognition has also used comparison techniques between samples and known signatures, as shown in U.S. Pat. No. 4,495,644 to Parks et al. and U.S. Pat. No. 4,701,960 to Scott which suggest that features plotted on x-y coordinates during the signature process can be stored and used for signature verification.

U.S. Pat. No. 4,499,499 to Brickman et al. suggests a method of image compression in which the bitmap representation of a word is compared to a bitmap representation dictionary through superposition of the detected word over the stored word to derive a difference value which is compared to a reference value indicating a degree of certainty of a match. Neither OCR methods which seek to encode a bitmap into characters processable as information by computer or bitmap methods for manipulation of images have proven completely satisfactory for all purposes of text manipulation or processing.

In U.S. patent application Ser. No. 07/459,026, filed Dec. 29, 1989, entitled "Changing Characters in an Image", by Bagley et al, a method is shown for changing characters in text appearing in an image. The character to be changed is identified and if the changed version of the image includes a character not in the text prior to the change, a shape comparing process is used to identify a word containing the newly required character, copy the character, and insert it into its new position. In U.S. patent application Ser. No. 07/459,022, filed Dec. 29, 1989, entitled "Editing Text in an Image", by Bagley et al, a method is shown for identifying and changing characters in text appearing in an image.

Alternative modes of expressing character recognition are known, such as U.S. Pat. No. 3,755,780 to Sammon et al., which discloses a method of recognizing characters wherein a shape of the character is represented by the number, position and shape of the character's contours. The number and position of the contour allow each character to be sorted according to these values. U.S. Pat. No. 4,903,312 to Sato discloses a character recognition system with variable subdivisions of a character region wherein a character is read to form a binary image. The binary image is then assigned a plurality of directionality codes which define a contour of the binary image. The binary image is then divided into a number of subregions, each of which has an equal number of directionality codes. A histogram of the directionality codes is calculated for each subregion. The histogram of the binary image is then compared with a number of known character contour histograms. Also, U.S. Pat. No. 4,949,281 to Hillenbrand et al. teaches the use of polynomials for generating and reproducing graphic objects, where the objects are predetermined in the form of reference contours in contour coordinates. Individual characters are represented as a linear field of outside contours which may be filtered, smoothed, and corner recognized before being broken into curve segments. Subsequently, the character is stored as a series of contour segments, each segment having starting points, base points and associated reference contours.

Certain signal processing techniques for comparing known signals to unknown signals are available if the word can be expressed in a relatively simple manner. U.S. Pat. No. 4,400,828 to Pirz et al. discloses a spoken word recognizor wherein an input word is recognized from a set of reference words by generating signals representative of the correspondence of an input word and the set of reference words and selecting a closest match. The word recognizor is used with a speech analysis system. A normalization and linear time warp device is disclosed. The input word and the set of reference words are processed electrically to determine correspondence. U.S. Pat. No. 4,977,603 to Irie et al. teaches an arrangement for pattern recognition utilizing the multiple similarity method, capable of taking structural features of a pattern to be recognized into account, so that sufficiently accurate pattern recognition can be achieved even when the pattern may involve complicated and diverse variations. The method includes the steps of: counting a number of occurrences, within each one of localized regions which subdivides a pattern to be recognized, of local patterns indicating possible arrangements of picture elements; deriving a vector quantity indicating distribution of black picture elements which constitute the pattern, from the numbers of occurrences of the local patterns; calculating multiple similarity, defined in terms of square of inner product of the vector quantity and one of prescribed standard vectors representing standard patterns; and recognizing the pattern by identifying the pattern with one of the standard pattern whose corresponding standard vectors gives the maximum values for the multiple similarity. "An Efficiently Computable Metric for Comparing Polygon Shapes," by Arkin, Chew, Huttenlocher, Kedem and Mitchell, *Proceedings of First Annual ACM-SIAM Symposium on Discrete Mathematics*, January 1990 (pp. 129–137) suggests that metrics can be established for shape matching.

All of the references cited herein and above are incorporated by reference for their teachings.

SUMMARY OF THE INVENTION

In accordance with the invention, there is provided a method for determining the boundaries of a word object or character string represented in image data, without a requirement for individually detecting and/or identifying the characters or symbols making up the string.

In accordance with one aspect of the invention, there is provided a method for determining text characteristic lines (i.e., baselines and/or toplines) for one or more lines of text within an array of pixels defining an image, including the determination of the orientation of the text lines. Once identified, the characteristic lines are used for further segmentation of the image to enable subsequent processing related to the identification of word shapes and the recognition of words or symbol strings based on the shapes.

In accordance with another aspect of the invention, the process for determining bounding reference lines for one or more word objects within data defining a first image includes not only the determination of the baselines, but also the blurring of the image to enable identification of the connected components or symbols associated with a word or character string.

In accordance with yet another aspect of the invention, there is provided a method for removing extraneous marks not lying within the boundaries of the word or character strings.

The present invention seeks to avoid the problems inherent in OCR methods, while utilizing the fundamental characteristics of words and text strings. Specifically, the signal to noise ratio inherent in image derivation, or the imaging process, is relatively small for a character, but relatively large compared to a larger character string. Moreover, word-to-word spacing tends to be larger than character to character spacing, and therefore, allows improved isolation and identification of character strings as compared to identification of individual characters. OCR methods also tend to require several correct decisions about aspects of a character preparatory to a correct identification, including identification of portions of the character as ascenders, descenders, curves, etc., all of which are fallible. Moreover, the present invention enables the removal of extraneous marks that may have been present on an original document, thereby facilitating more reliable identification and recognition of words. Identification of word boundaries in accordance with the present invention, initially requires determination of the characteristics of the text or symbol lines within the image. Subsequently, derivation of a one-dimensional signal representative of the word shape, and comparison of the derived signal to known word shape signals may be completed. Hence, assumptions about the word are not made until the comparisons occur, thereby eliminating the impact of invalid character based assumptions which may cause subsequent erroneous comparisons and decisions.

In examining potential uses of computer processed text, it has been determined that, at least in certain cases, deriving each letter of the word is not required for processing requirements. Thus, for example, in a key word search of a text image, rather than converting, via OCR techniques, each letter of each word, and subsequently determining from the possibly flawed character coding whether one or more key words are present, a computer might instead generate and compare the shapes of words within the text image with the shape of the key word, and evaluate whether the key word is present by shape. The output of such a system would most likely present an indication of the presence of the key words to an accuracy acceptable to a user. Furthermore, it is believed that the described method will have processing speed advantages over OCR methods. Moreover, the present invention may also have applications in image editing systems and is, therefore, not intended to be limited to the embodiment described.

The probability of an incorrect determination of a letter by OCR methods may be relatively low, however, the probabilities are multiplicatively cumulative over an entire word. Hence, using OCR to convert words into character code strings, prior to searching for, or recognizing, the words may result in considerable error. The present invention utilizes word level segmentation of the image data to enable subsequent word recognition in a manner similar to that which humans use while reading or skimming a text passage. Moreover, the described word shape recognition process has several advantages. First, the bitmap image data is not irretrievably lost, and a reasonable representation of the bitmap remains so that a user may examine a reconstructed bitmap for word determination, if desired. Secondly, by utilizing complete words, each letter has the context of the word to assist in the word's comparison to other word shapes. The presence of a poorly formed letter in a word only minimally affects the total identifiability of the word shape signal, by slightly increasing the difference value between two compared signals. Thirdly, small words, which have the greatest probability of false recognition in the present invention, generally have the lowest information content. Accordingly, the words in which errors are most likely to occur are the words which are of least importance in an information content sense. In addition, when considered in comparison with the performance of OCR methods, which are more likely to result in mistakes for words having more characters, the present invention generally exhibits a more robust word recognition capability.

OCR methods convert from a bitmap to a representative character code, thereby losing the informational content of the bitmap. In general, the process is not reversible to obtain the original bitmap from the character code. However, identification of words based on shape, as described in accordance with the present invention, tends to retain more bitmap information further into the recognition process, thereby enabling a reasonable reconstruction of the bitmap from the one-dimensional signal. Hence, a significant portion of the bitmap information is retained by the one-dimensional signal used to represent the shape of the selected text or character string.

BRIEF DESCRIPTION OF THE DRAWINGS

Other objects and advantages of the present invention will become apparent from the following description taken together with the drawings in which:

FIG. 2 shows an image sample of example text over which the inventive process will be demonstrated;

FIG. 3 is a copy of a scanned image of the example text;

FIGS. 15A and 15B illustrate derivation of a single independent value signal, using the example word "from", which appears in the sample image of example text;

FIGS. 18A, 18B, 18C and 18D illustrate derivation of a single independent value signal, using the example word "from";

FIGS. 19A, 19B, 19C and 19D illustrate derivation of a single independent value signal, using the example word "red", which does not appear in the sample image of example text;

DESCRIPTION OF THE PREFERRED EMBODIMENTS

The Appendix contains source code listings for a series of image manipulation and signal processing routines which have been implemented to demonstrate the functionality of the present invention. Included in the Appendix are four sections which are organized as follows:

Section A, beginning at page 1, comprises the declarative or "include" files which are commonly shared among the functional code modules;

Section B, beginning at page 26, includes the listings for a series of library type functions used for management of the images, error reporting, argument parsing, etc.;

Section C, beginning at page 42, comprises numerous variations of the word shape comparison code, and further includes code illustrating alternative comparison techniques than those specifically cited in the following description;

Section D, beginning at page 144, comprises various functions for the word shape extraction operations that are further described in the following description.

Figure 1A:
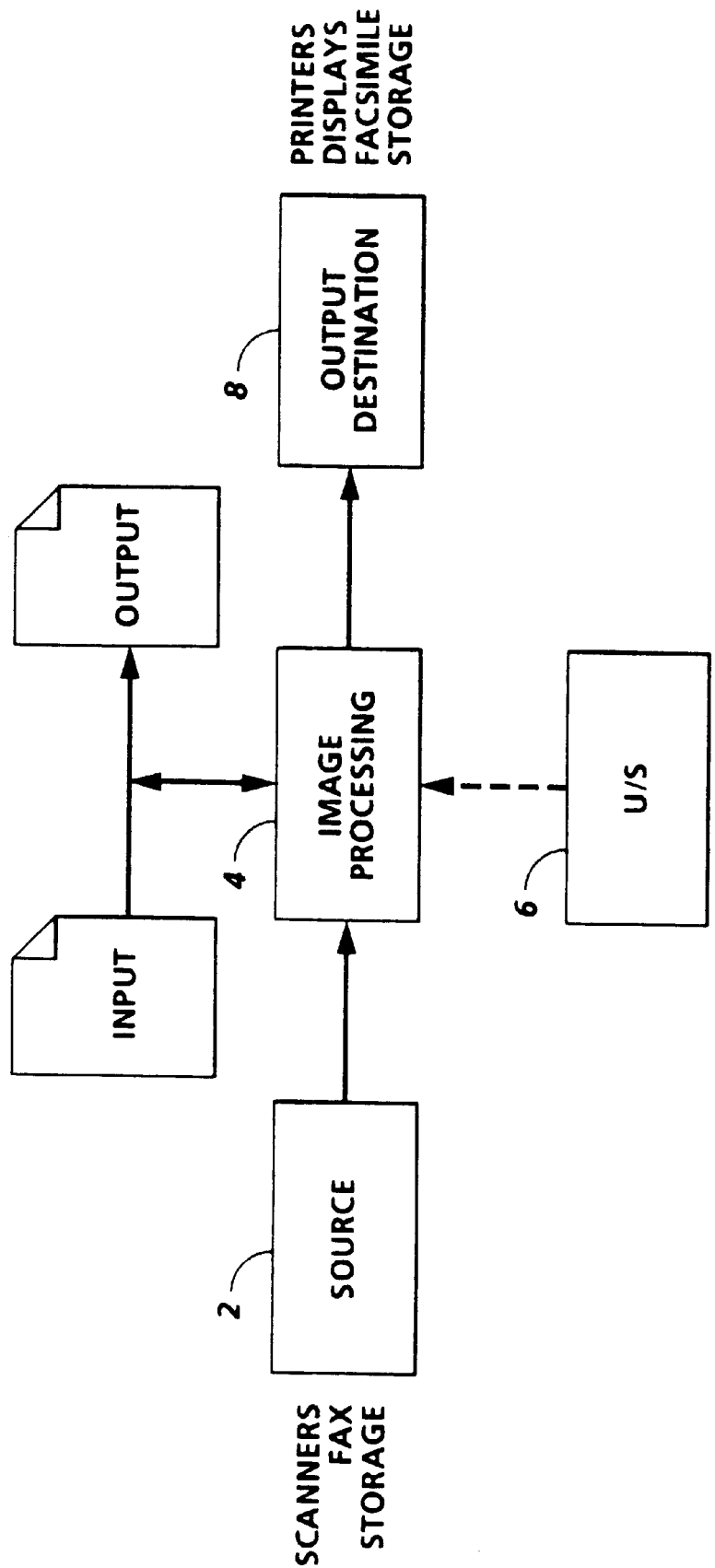
FIG. 1A shows a generalized system diagram of an image processing system in which the present invention would find use.

Referring now to the drawings where the showings are for the purpose of illustrating a preferred embodiment of the invention, and not for limiting same, FIG. 1 shows a generalized image processing system, which covers numerous situations in which the present invention may find advantageous use. Generally, a source image may be derived from a source image derivation system 2, which may be a scanner, facsimile device, or storage system. The source image is forwarded to a computer processing device 4 which may be any of several well known devices including the inventive device described herein. In response to commands entered at user interface 6, processing device 4 produces an output at an output device 8, which may be a printer, display, facsimile device or other storage device. In essence, as is shown in the upper portion of FIG. 1, an input document is directed into a system and an output document is retrieved from it.

In the following description, an image is generally described as an image bitmap, where an image is represented as a plurality of image signals. These signals, commonly referred to as pixels, are typically denoted as black when intended to represent a corresponding mark or active position on a document from which they were produced. However, these constructs have been used to enable the description of the present invention, and are in no way intended to limit the domain of such to black-and-white or binary images. Rather, the present invention is generally applicable across a broad range of image representation techniques. Moreover, the present invention for determining word boundaries may also have applications in image editing systems and is, therefore, not intended to be limited solely to the embodiment hereinafter described.

Figure 1B:
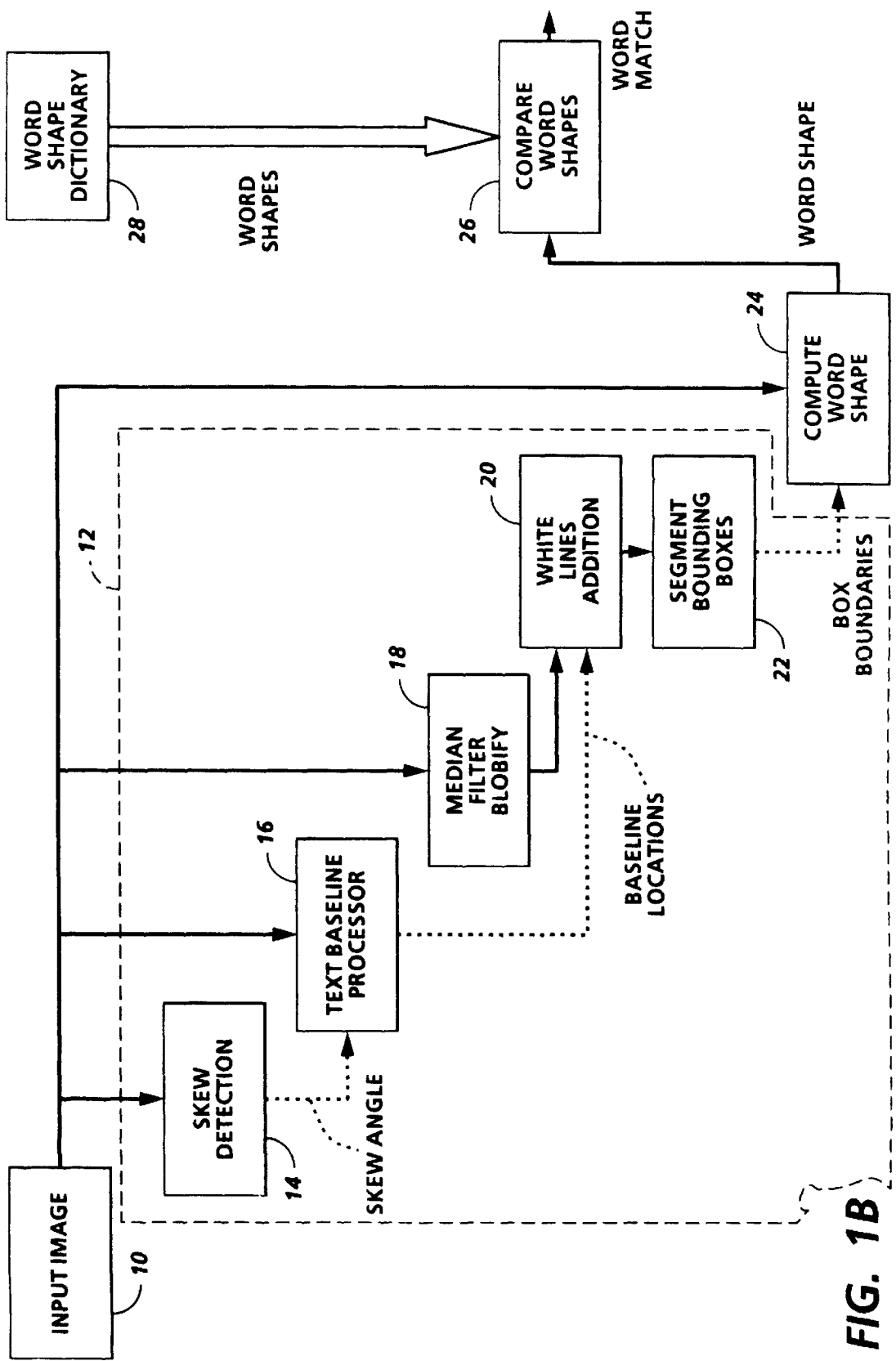
FIG. 1B shows a block system diagram of the arrangement of system components forming one embodiment of the inventive word shape recognition system.

FIG. 1B, shows a system which embodies the present invention for deriving, defining, and comparing words in terms of their shapes. It will, of course, be recognized that each element of the system may be many devices, or may simply be a program operated within a single device. Beginning with an input bitmap 10, whose source is indeterminate, and not part of the invention, a bitmap is initially directed to a segmentation system 12, in which words, or character strings, or other multi-character units of understanding, will be derived. Initially, the image bitmap passes through skew detector 14, which determines the angle of orientation of text in the image. Using information about the orientation of the image, and the image itself, at text baseline processor 16, toplines and baselines of the text are determined, so that upper and lower boundaries of lines of text within the image are identified. At median filter 18, the function referred to as "blobify" is performed, which operates on the image so that each word group in a line may be isolated and subsequently treated as a single unit. As used herein, "word", "symbol string" or "character string" refer to a set of connected alphanumeric or punctuation elements, or more broadly, signs or symbols which together form a single unit of semantic understanding. Such single units of understanding are characterized in an image as separated by a spacing greater than that which separates the elements, signs or symbols forming the unit. To the blobified or filtered image, a set of white lines may be added at block 20, to clearly separate adjacent lines of text. The white line locations are based on baseline determinations provided by processor 16. Using this information, i.e., the blobified words, which are clearly separated from adjacent words and words in adjacent lines, a bounding box is defined about the word at block 22, thereby isolating and enclosing the symbols which form the word. At this point, alternative applications for the present invention, for example text or word editing systems, may employ the isolated word shapes for subsequent manipulation of the image. Hence, the present invention is not solely limited to use in a word recognition context.

Thereafter word shape signal computer 24 derives a word shape signal representing the individual words in the image, based on the original image and the bounding box determinations. This information is then available for use at a word shape comparator 26, for comparing word shape signals, for example, known word shapes from a word shape dictionary 28, with the as yet unidentified word shape signals generated from the image. In an alternative embodiment word shape comparator 26 may be used to compare two or more word shapes determined from image 10. More importantly, word shape comparator 26 is not limited to the comparison of word shapes from unrecognized strings of characters to known word shapes. In a simplified context, comparator 26 is merely an apparatus for comparing one word shape against another to produce a relative indication of the degree of similarity between the two shapes.

Having generally described the steps of a word shape recognition process, the mathematical bases of such a system may also be considered. Considering, for example, image data $i(x,y)$, which in one common case could be an array of image data in the form of a bitmap, a character set is identified in one of many methods, perhaps as described above, which defines a boundary enclosing the selected character string within a subset of the array of image data. From $i(x,y)$, an edge signal or contour, $e(x,y)$, which represents the edges of $i(x,y)$ detected within the closed boundary, is derived. The edge signal is augmented by adding additional data to $i(x,y)$ so that $e(x,y)$ is a continuous signal $e'(x,y)$ defined over its entire domain with respect to an independent variable within the closed boundary. One, two, or more signals may be derived from $e'(x,y)$ which are each one-dimensional signals $g'(t)$ where $g$ is a function of the independent variable $t$ which is a reference frame dependent parameter.

The mathematical explanation of the word shape derivation process suggests that alternative methods of deriving the word shape signal exist. Some possible alternatives are the establishment of the one-dimensional signal using an alternative coordinate scheme, for example polar coordinates. Another possibility is generation of signal $g(t)$, where $g(t)$ represents the direction from each contour point to the succeeding contour point, where $t$ would represent the point number.

Next, a computational method of calculating the word shape or contour will be given. Once orientation of the image is established and line spacing and word group spacing is established, each word can be surrounded by a bounding box. A reference line is then created extending through the character string image. The reference line may be a block having a finite thickness ranging from two-thirds of the x-height to one-third of the x-height, or in fact it may have a zero width. At the resolution of the image, the distance from the reference line to the upper edge of the text contour or bounding box is measured in a direction perpendicular to the reference line. Similarly, measurements may be made from the reference line to the lower bounding box edge or to the text contour along the lower portion of the word. Because the set of values derived computationally can be expressed in terms of position along the horizontal axis versus length, the signal can be considered a one-dimensional signal. Either or both of these values may be used to describe the word shape. Additionally, although possibly less desirable, it is well within the scope of the invention to measure the distance of a perpendicular line drawn from the top of the bounding box or the bottom of the bounding box, to the first contact with the word or the reference line, as desired.

It is important to realize that the mathematical process used for the derivation of the one-dimensional signal is essentially reversible. It will be noted that if the reference has a finite thickness and is therefore taken out of the image, that portion of the image is not identifiable, however, if it has a zero width, the information still remains.

A recognition dictionary, or look up table of word shapes, can clearly be created through the use of the described process. The process can be carried out using either scanned words as the source of the information, or in fact, they can be computer generated for a more "perfect" dictionary.

Having defined the general method and apparatus for word shape comparison, as well as, the mathematical basis for the method, each step will now be more completely described. To further demonstrate the process of the invention, at FIG. 2, a sample image, taken from a public domain source is shown, having several lines of text contained therein. FIG. 2 demonstrates approximately how the image would appear on the page of text, while FIG. 3, shows a scanned image of the page, which demonstrates an enlargement of the image of a bitmap that would present problems to known OCR methods. Looking at, for example, the image of the word 50 "practitioner" in the first line of the text image, it may be seen that several of the letters run together. Also, at the lower left hand portion of the image, circled and numbered 52, noise is present. Looking at the word "practitioner's", circled and numbered 54, the running together of a punctuation mark and a letter is further noted.

Figure 4A:
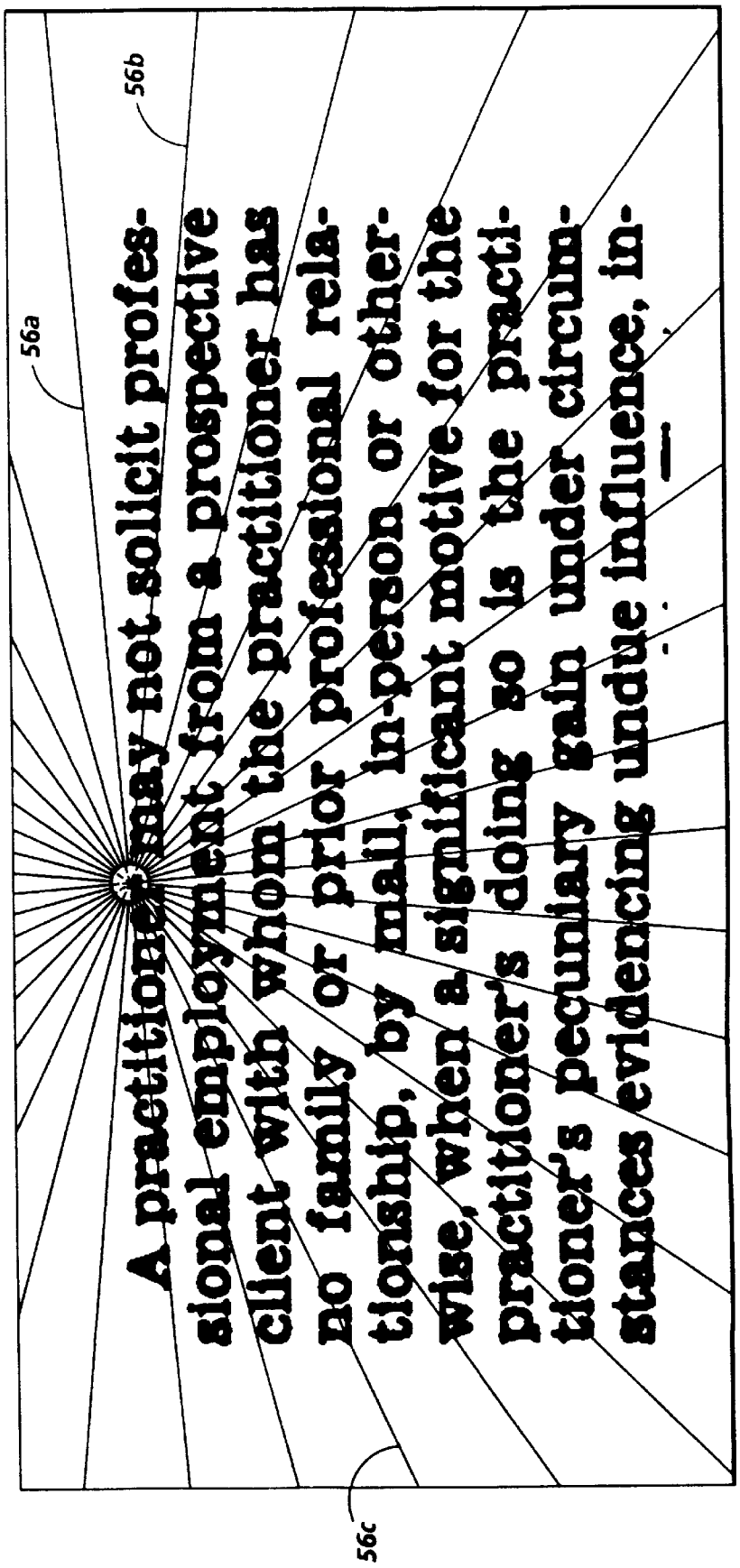
FIGS. 4A, 4B and 4C graphically illustrate the process used to determine the angle at which the example text is oriented in the image sample prior for further processing, while 4D, shows graphs of the responses taken from the example text, which are used to determine the angle at which the example text is oriented in the image sample prior to further processing.

In one possible embodiment of the invention, skew detector 14, may be implemented as described in the U.S. patent application for "Coarse and Fine Skew Measurement,"Ser. No. 07/737,863 by Wayner et al., which has been previously incorporated by reference. A general method for determining the orientation of the text lines in the image, looks at a small number of randomly selected edge pixels (defined as a black pixel adjacent to at least one white pixel), and for each edge pixel considers a number of lines, 56a, 56b, 56c being examples, extending from the pixel at evenly spaced angular increments over a specified range of angles. The edge pixels are selected randomly from the set of all image pixels by the function RandomEdgePixel( ) (Appendix, page 243). FIGS. 4A (see lines 56a, 56b, 56c), 4B (see lines 58a, 58b, 58c) and 4C (see lines 60a, 60b, 60c) represent a series of increasingly smaller angular ranges over which the above mentioned technique is applied to illustrative edge pixels to accurately determine the angular orientation of the text within the image. Subsequent to finding edge pixels and defining the lines, skew detector 14 traces the path of each line, determining the lengths, in pixels, of strings of successive black pixels which are intersected by the line. Upon reaching the image boundary, an average black pixel string length is calculated by summing the lengths of the individual strings, and dividing the sum by the total number of distinct strings which were found. This operation is carried out for all the lines, thereby arriving at an average black pixel string length for each line extending from the selected edge pixel. These lengths are plotted on FIG. 4D as curve A, showing minima at approximately 0 and 3.14 radians. Curve A is a graphical representation of the summation/averaging function over each of a series of angled lines extending from the edge pixel, and spread over a range from 0 to $2\pi$ radians. Once a first minimum has been located, verification of the minimum (in the example, approximately 0 radians) is achieved by determining whether a second minimum exists at approximately n radians from the first minimum. Upon verifying the existence of a second minima (in the example, approximately 3.14 or n radians), a coarse skew angle is identified. Subsequently, it is necessary to more closely determine the skew angle of the text. This is accomplished by utilizing a number of lines which extend from a randomly selected edge pixel, where the lines differ by smaller angular increments, and the angular range is centered about the coarse skew angle. However, the fine skew angle may be determined by analyzing the total number of black pixels contained along a predetermined length of the lines. More specifically, the number of pixels over a unit distance are plotted as curve B on FIG. 4D, and the fine skew angle is determined by identifying the maxima of the curve. In other words, the point of the curve where the highest concentration of black pixels per unit line length exists, more accurately represents the angle of the text lines in the image. As shown by curve B, this results in a fine skew angle of approximately 0 radians, where the line intersects with the most black pixels along its length, and therefore is representative of the closest angle of orientation that needs to be determined.

Figure 4B:
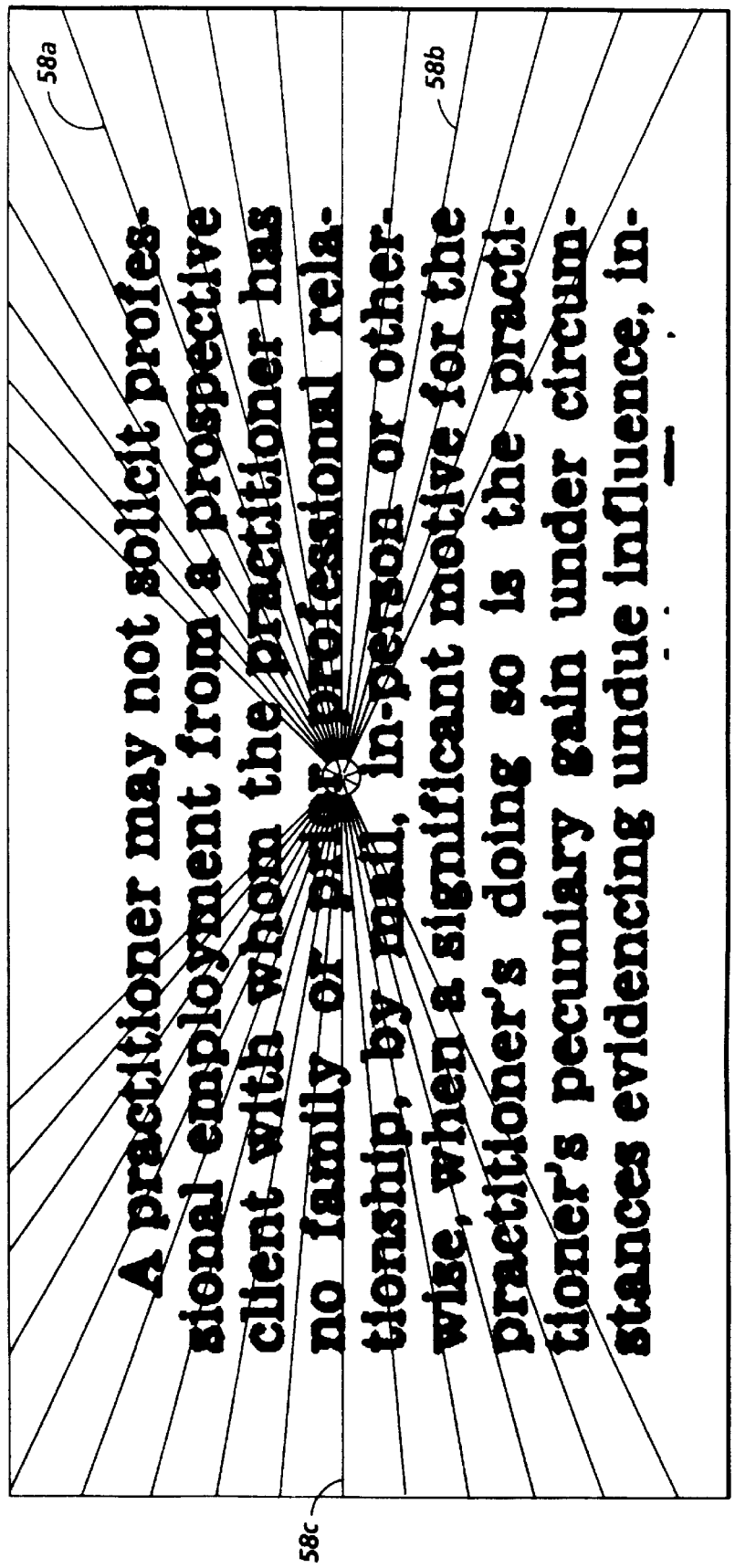
Figure 4C:
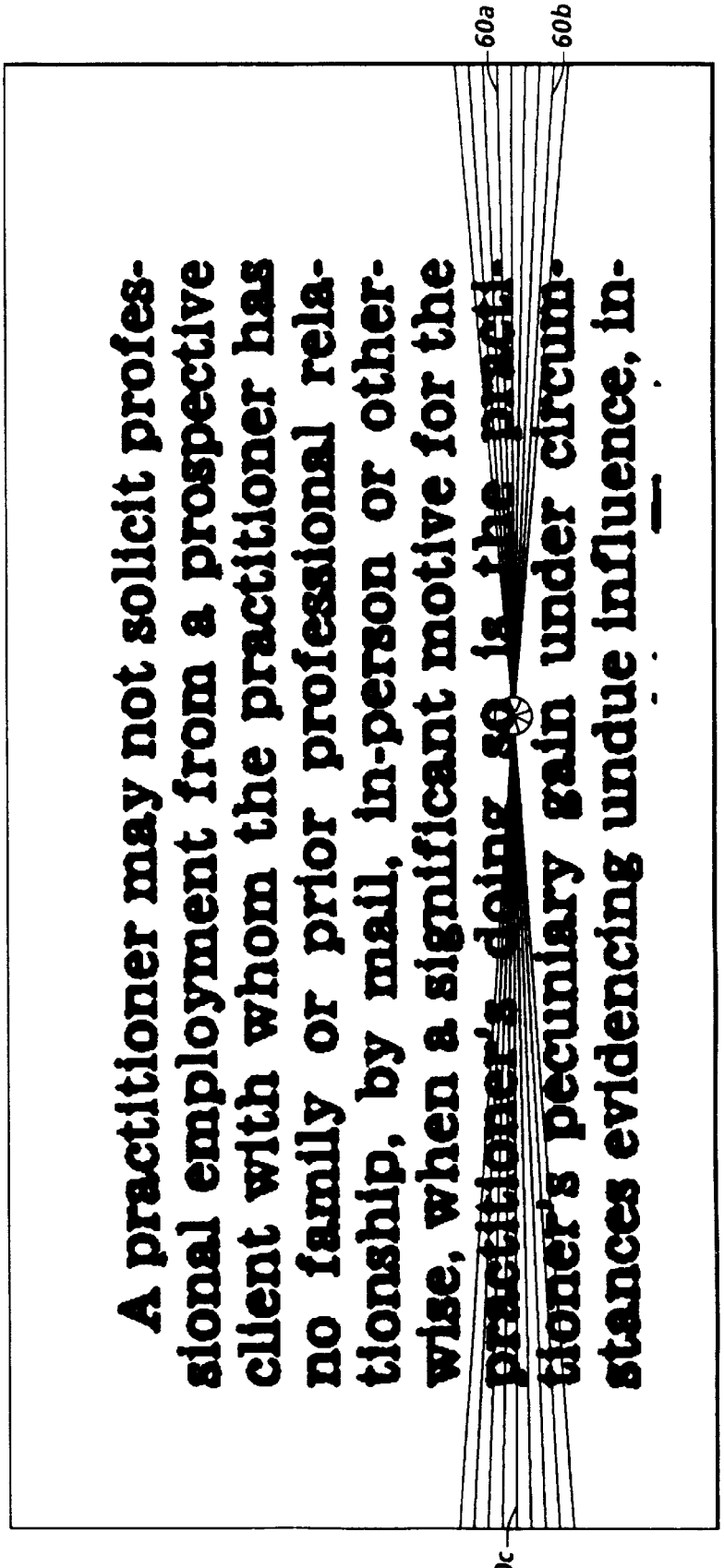
Figure 4D:
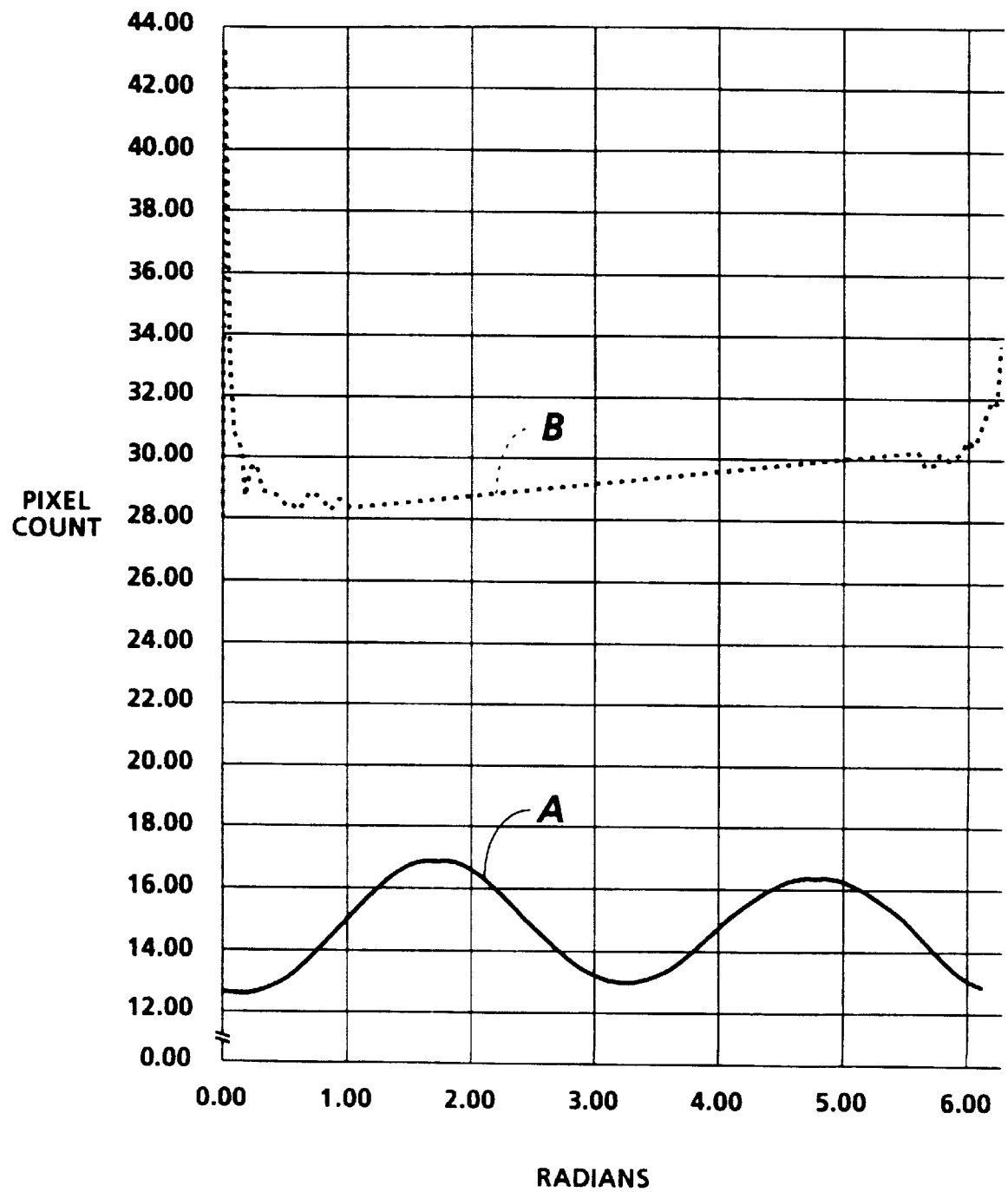

Alternatively, the skew angle may be determined as indicated by the NewFine( ) function (Appendix, page 245), which determines the skew angle using multiple iterations of the procedure described with respect to the fine angle determination. As indicated by FIGS. 4A, 4B, and 4C, each iteration would also use lines covering an increasingly smaller angular range, until a desired skew angle accuracy is reached. In the implementation illustrated by FIGS. 4A, 4B, and 4C, the desired accuracy is achieved by a series of three iterations, each using a series of 180 distinct angles about the selected edge pixel.

Figure 5A:
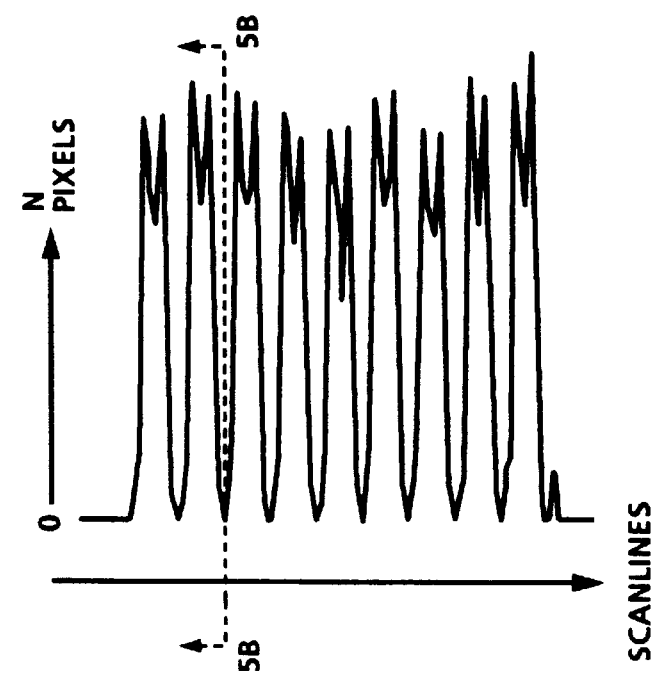
FIGS. 5A and 5B respectively show the derivation and use of a graph examining the sample image of the example text to determine baselines of text within the image, FIG. 5B showing only a portion of the larger graph of FIG. 5A.
Figure 5B:
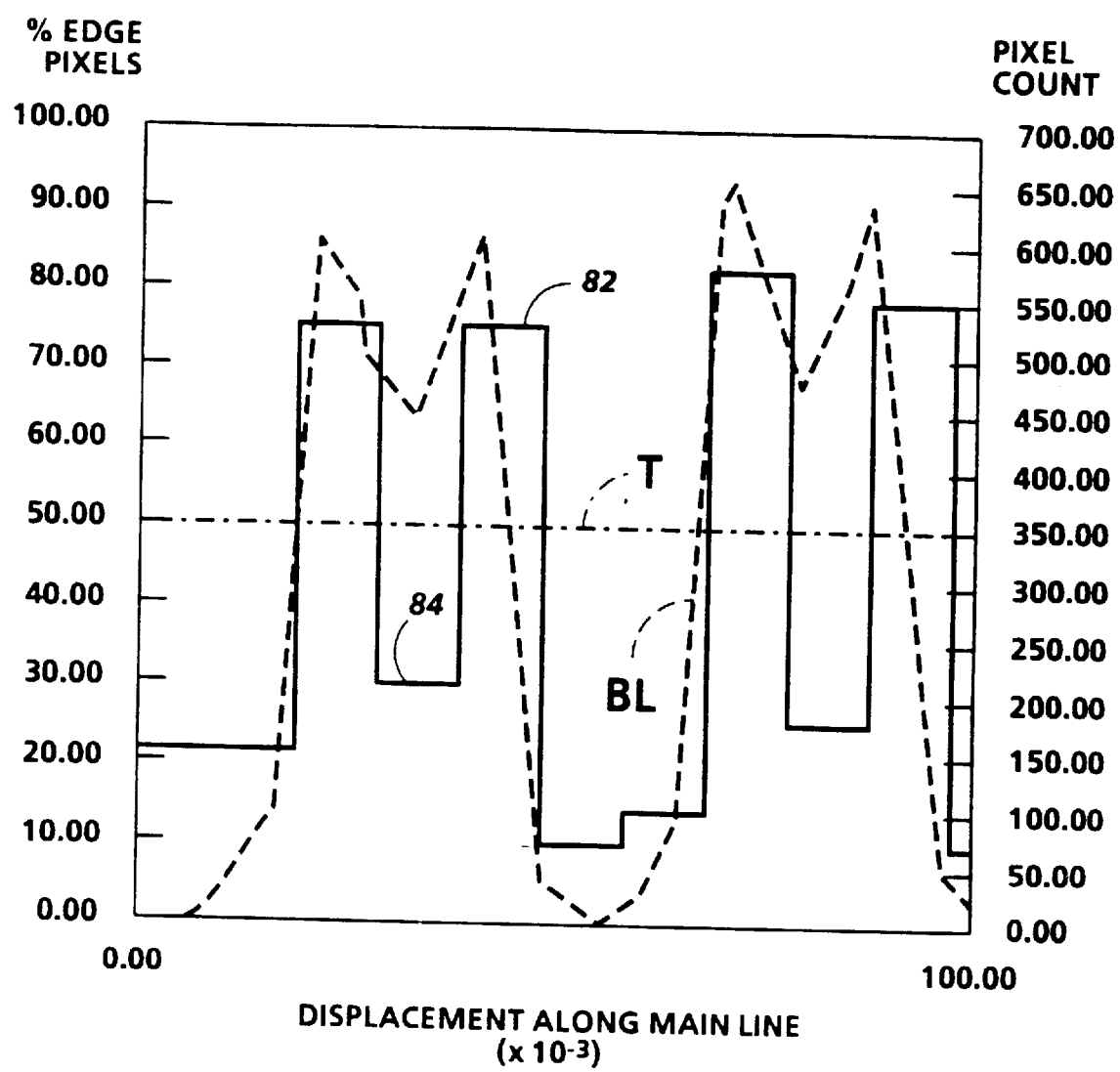
Figure 6A:
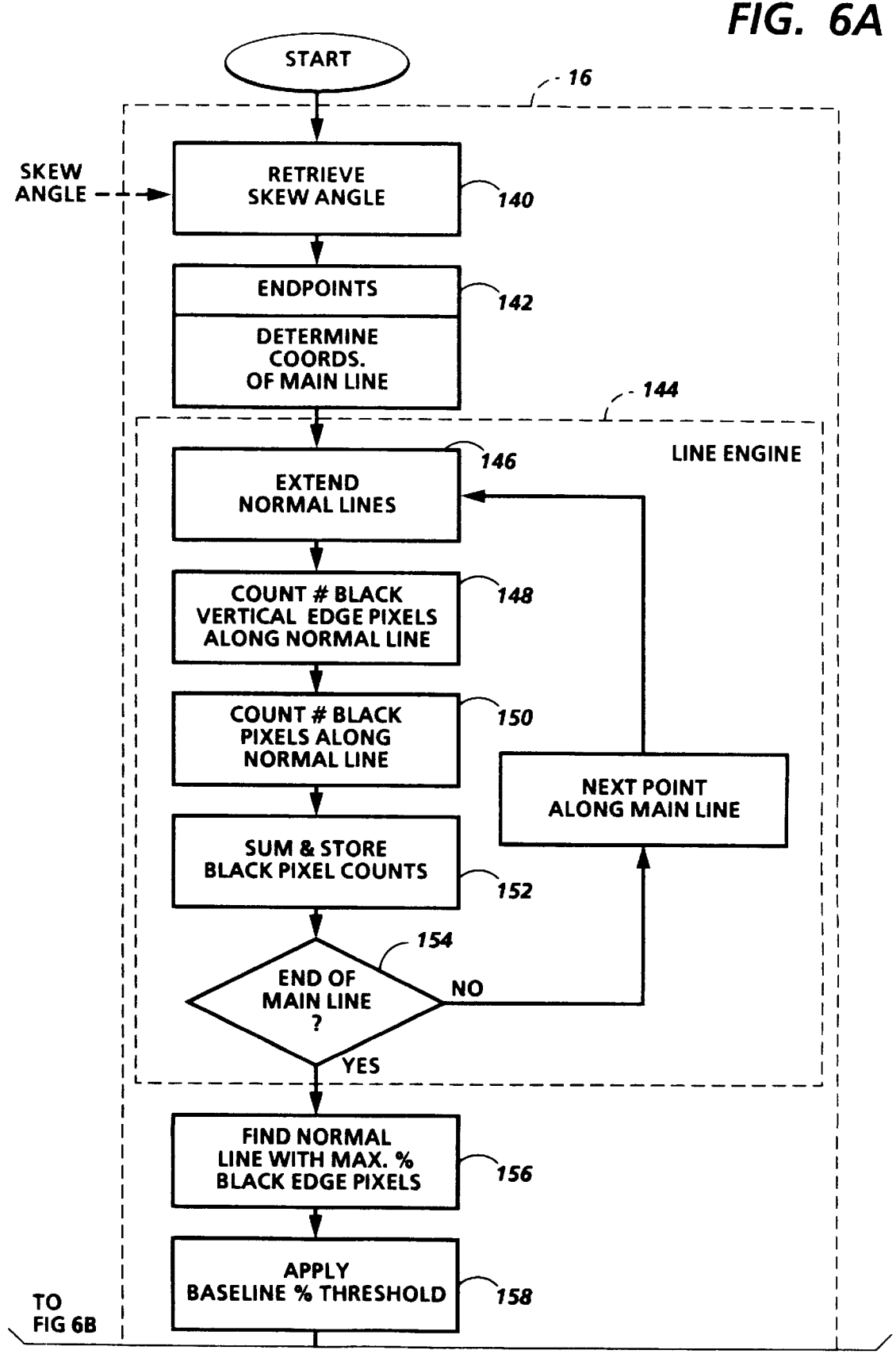
FIGS. 6A and 6B are flowcharts illustrating the procedures executed to determine the baselines shown in FIG 5A.
Figure 6B:
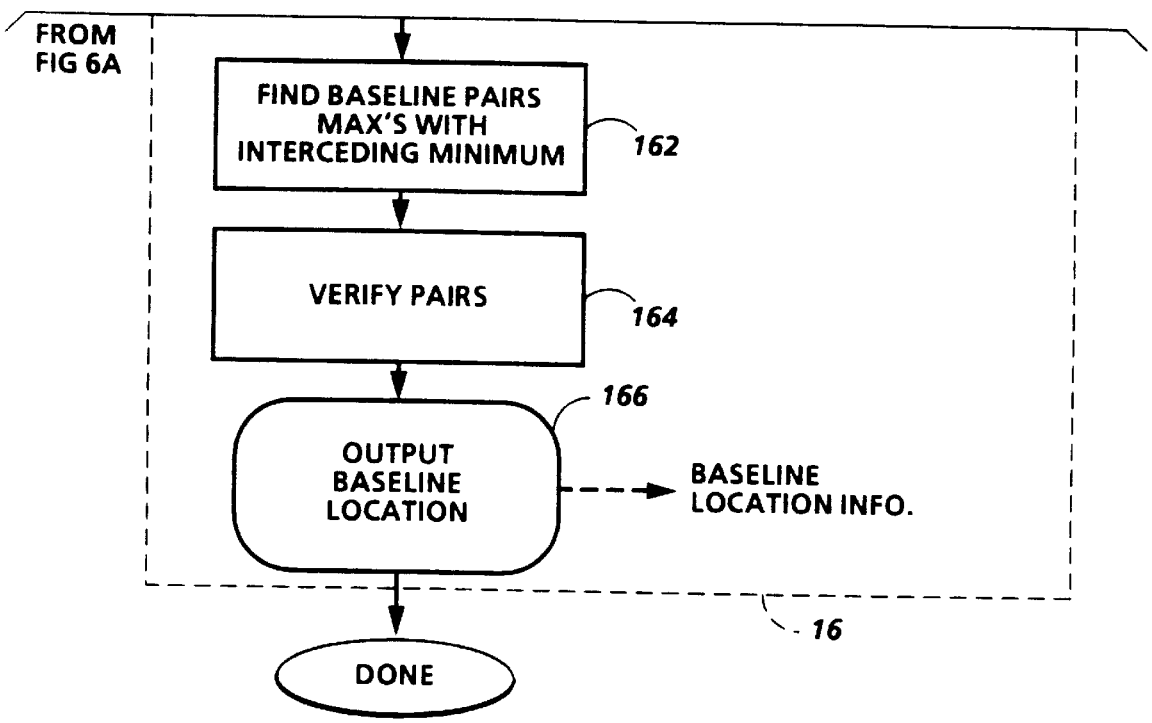

In the next process step, illustrated in the graphs of FIG. 5A and FIGS. 5B, text baseline processor 16 identifies the characteristic lines, upper topline and lower baseline, of each line of text. The process steps executed by text baseline processor 16 are illustrated in detail in FIGS. 6A and 6B. The histogram of FIG. 5A, shown to the left along the image, is derived by examining lines, at the resolution of the image, and oriented parallel to the skew orientation of the image, as defined by the previously determined skew angle. These parallel lines spanning the image are used to determine the number of black pixels intersected by each of the lines. Along lines passing through inter-text line spaces, no black pixels should be intercepted, while along lines through the text, large numbers of black pixels should be intercepted.

More specifically, the function BaseLines( ), (Appendix page 160), first finds the coordinates of a "main" line, block 142, constructed through the center of the image and perpendicular to the text lines, as determined by the skew angle passed to the function, shown by block 140. Next, Line Engine Procedure 144 is executed, where by proceeding along the main line from one end to the other, at a series of points along the main line, perpendicular branch-lines are constructed which extend outwardly from the main line for a fixed distance, block 146. Along the branch-lines, the number of black vertical edge pixels are counted, block 148, and the number of black pixels intersected by the lines are counted, block 150, and summed for the opposing pairs of lines, block 152. Black vertical edge pixels, as counted by block 148, are defined as black pixels having a white neighboring pixel at either the upper or lower neighboring pixel position, and where directions are described with respect to a text line oriented in a generally horizontal direction. Hence, the black vertical edge pixels represent the vertical extents of the symbols which they define.

LineEngine( ) procedure 144 is repeated until all points, and associated branch-lines, along the main line have been processed, as determined by decision block 154.

Subsequently, the counts for all the branch-lines are analyzed to determine the branch-line pairs having the highest ratio of black vertical edge pixels to black pixels. In general, those lines having the highest ratio or percentage of black vertical edge pixels would correspond to lines passing along the upper and lower edges of the characters which form the text lines. As illustrated in the enlarged view of FIG. 5B, a definite distinction exists between those branch-lines having a high vertical edge pixel ratio, for example position 82, and those having a low ratio, such as line 84. Application of a filter mask and comparison of the maximum peaks within the mask enables the identification of those lines which represent the text toplines and baselines, for example, position 82. The process is implemented in the maxFilter.c module beginning at line 57, the code for which is also incorporated in the newBaselines.c module at line 274, page 214.

The baseline identification process, BaseLines( ), which is found beginning on page 217 of the Appendix, begins by finding the relative peaks in the ratio data. Using the peaks as an estimate of the approximate locations of the baselines and toplines, the process subsequently finds the mode, or most common distance, between the adjacent peaks. Using this distance value, the width of a mask can be determined for subsequent application to the data. As found on Appendix page 220, line number 331, the maskWidth variable is set to eighty percent of the most common peak separation. This value is based upon a desire to encompass a broad range of ratio data, while minimizing the potential of having data from two actual characteristic lines within the mask range at any time. Hence, eighty percent of the mode distance for the ratio maximums has proven to be a reasonable mask width.

Once the appropriate width of the mask has been determined, the mask may then be applied to the ratio histogram data displayed in FIG. 5B. First, an array of counters, newsignal [ ], is established, having a counter for each branch-line pair. Next, the mask is applied across the branch-line ratio data, and the branch-line pair having the highest ratio within the set of branch-line pairs "covered" by the mask has its corresponding counter incremented by one. This process continues sequentially, shifting the mask by one displacement or branch-line position each time, until the mask has been applied across the entire length of the main line. When all branch-line ratios have been processed with the ratio mask, the resulting counter array is analyzed to to find the branch-line pair with the highest counter value. Using a threshold of eighty percent of the maximum counter value, the newSignal [ ] counter array is again analyzed, and those branch-line counters having values greater than the threshold, and an intervening value less than the previous maximum, are identified as baselines or toplines. Once identified, the baseline and topline pairs are verified by first assuring that an even number of line pairs are identified, assuming that the image had only complete text lines, and was not, for example, "windowed" out of a larger image, which could result in the retrieval of only a portion of the top and or bottom text lines.

An additional test may also be applied to the histogram operation of step 150. This added test, a boolean test, may be used to assure that a minimum run of black pixels was detected during the analysis of the line. For example, a flag, which is cleared at the start of each branch-line analysis, may be set whenever a series of five sequential black pixels are detected along the line. This test would assure that small noise or image artifacts are not recognized as baselines due to a high vertical edge pixel ratio.

As an alternative method, it is possible to utilize the total number of black pixels lying along the branch-lines to determine the locations of the baselines. Using histogram curve BL, which represents the number of black pixels counted along the branch-lines, it is possible to determine which branch-lines have the most black pixel intersections. Applying a threshold to the maximum allows the determination of the upper and lower characteristic line pairs for each text line. Hence, the rising and falling portions of the histogram curve BL, generally constitute the characteristic lines of the text, and the threshold would be used to specifically identify the localized maxima surrounding an intervening minima, thereby enabling identification of the baseline positions which would be used for further processing. More importantly, this alternative approach, illustrated as step 162, may be utilized to identify the upper and lower baselines of a baseline pair, based upon the slope of the BL histogram curve. It is important to note that there is little additional processing associated with the identification step as the histogram information was collected previously during step 150.

Having identified the preliminary characteristic line or baseline pairs at block 162, a verification step, block 164, is executed to verify that the baseline pairs are separated by more than a minimum distance, the minimum distance being established by calculating the average line pair separation for all line pairs in the image. After verification, the valid baseline information is stored by output block 166 for later use by the white line addition and segmentation blocks, 18 and 20, respectively.

Figure 7:
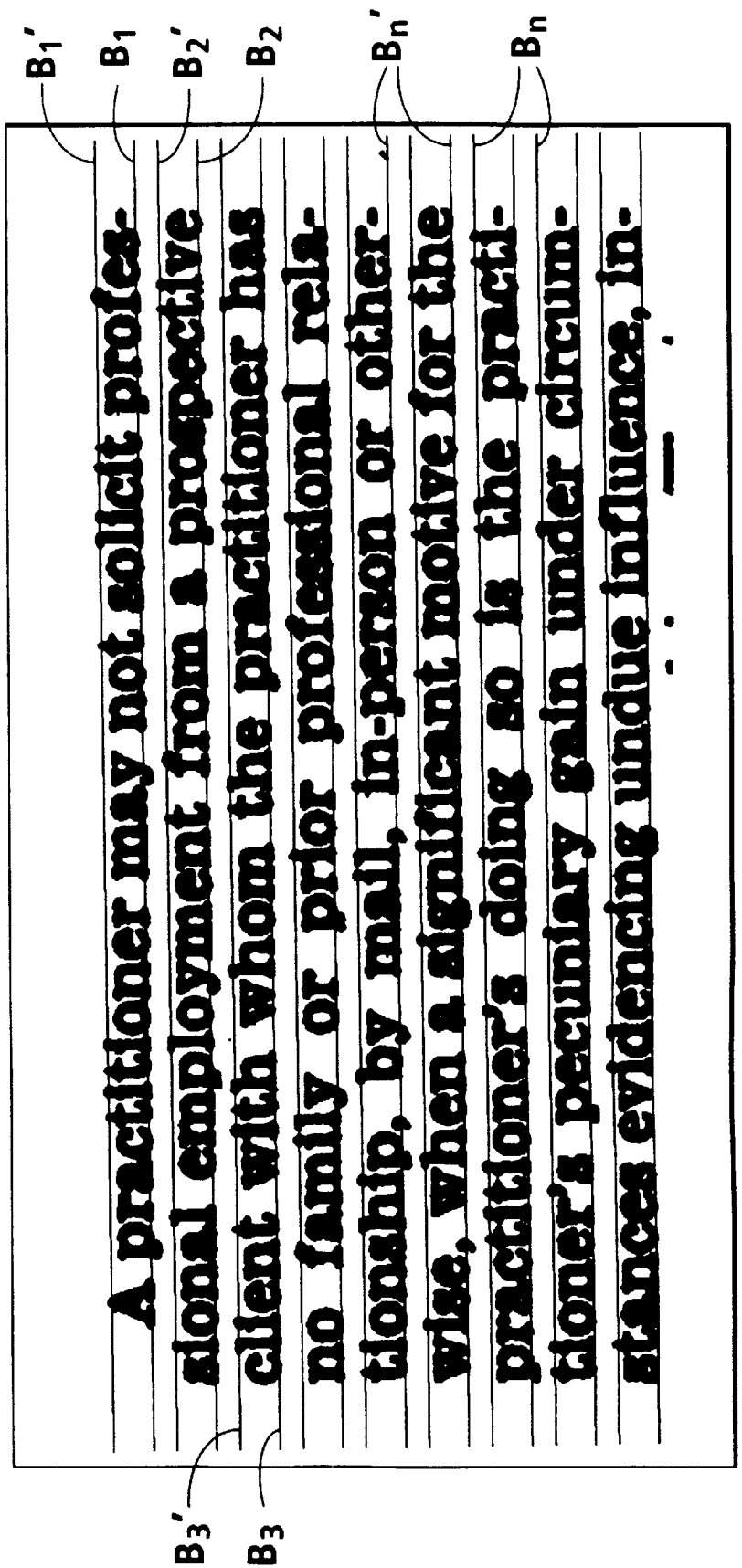
FIG. 7 shows the scanned image of the example text with baselines indicated thereon after derivation from the data shown in FIGS. 5A and 5B.

An important advantage of the aforedescribed baseline determination methods is their relative insensitivity to noise or extraneous marks in the interline space. FIG. 7 shows the result of a baseline determination operation on the example image of the sample text, showing that baseline pair, baseline and topline $B_n$ and $B_n'$, respectively, have been located on the image, indicating those portions of the image in which a predominant portion of the text occurs. While some portions of the character ascender strokes are outside the baselines, no detriment to the remainder of the process is noted. Of course, adjustment of the threshold values used in the baseline determination process would enable the system to capture more of the ascending strokes.

Figure 8:
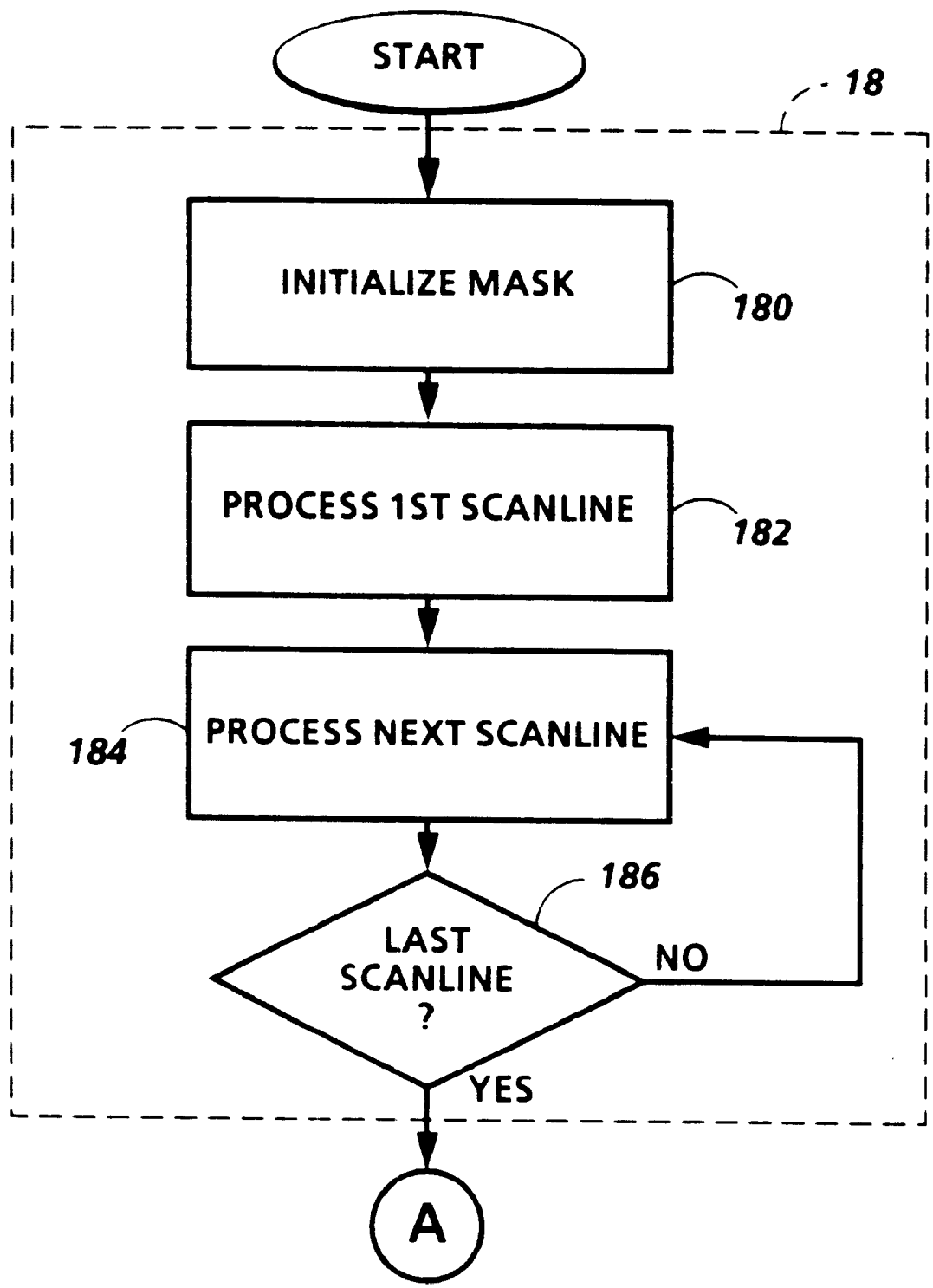
FIG. 8 is a flowchart illustrating the steps used in the application of a median filter to the image of FIG. 2.
Figure 9:
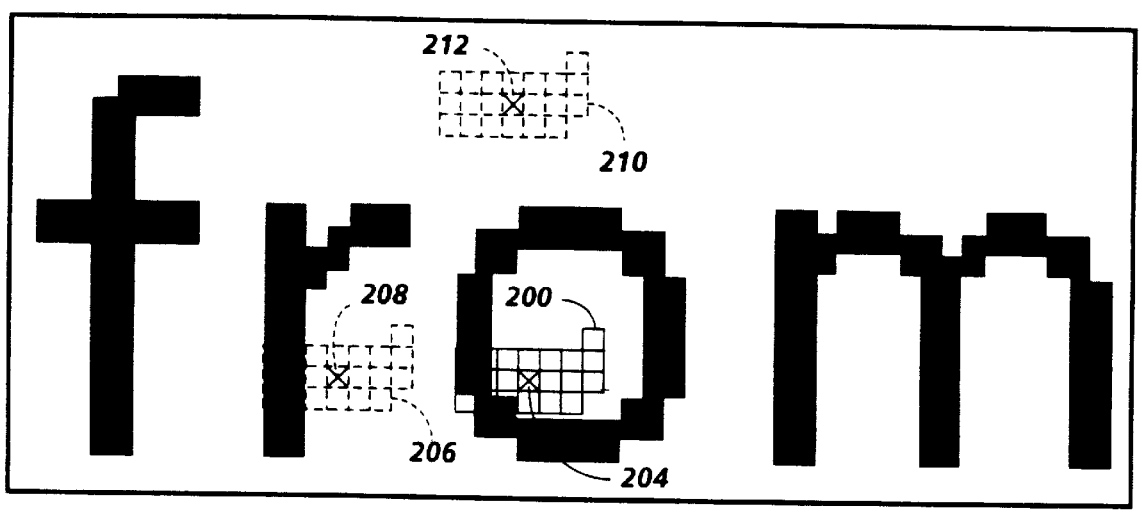
FIG. 9 is an enlarged pictorial representation of a portion of the image of FIG. 2, illustrating the application of the median filter.

With reference again to FIG. 1B in conjunction with FIGS. 8 and 9, the next process step is a word group isolation step. A filter 18 is applied to a copy of the image which results in a filtered image that tends to render the word into blobs distinguishable from one another in local areas. This process relies on the fact that the intercharacter spacing in a word is generally smaller than the inter-word or inter-line spacing for the surrounding textual image. The filter is applied with a small window, to each area, to render as black those areas that are partly black. As shown in FIG. 8, the blobify function (Appendix page 165) first initializes mask variables which establish the mask size and angle, block 180, and then processes the upper scanline to initialize the data array, block 182. Median filtering is accomplished by sequentially moving the mask window through the image, blocks 184 and 186, and whenever the number of black pixels appearing in the window exceeds a threshold value, the target pixel, about which the window is located, is set to black.

Referring also to FIG. 9, which illustrates some examples of the filter process, mask window 200 is placed over a portion of the image to determine if a center pixel should be set to black in order to blur or fill-in the intercharacter gap. For example, with approximately a twenty percent threshold and a generally rectangular mask covering approximately twenty-one pixels, arranged at an angle approximately equal to the angle of skew previously determined for the text, the result of filtering in window 200 would be the setting of pixel 204 to black. Similarly, window 206, which primarily lies within the intercharacter spacing between the pixel representations of the letters "r" and "o", would cause pixel 208 to be set to black. On the other hand, window 210, which lies in the region between word groups, would not have a sufficient number of black pixels present within the window to cause pixel 212 to be set to black. The size, shape and orientation of mask window 200 is optimized to reduce the filling in between text lines, while maximizing the fill between letters common to a single word. In alternative embodiments, the mask window may have different shapes, sizes, and orientations. The mask windows illustrated in FIG. 9 reflects a mask that was suitable for blurring the intercharacter gaps without over-filling the larger inter-word and interline gaps.

Figure 10:
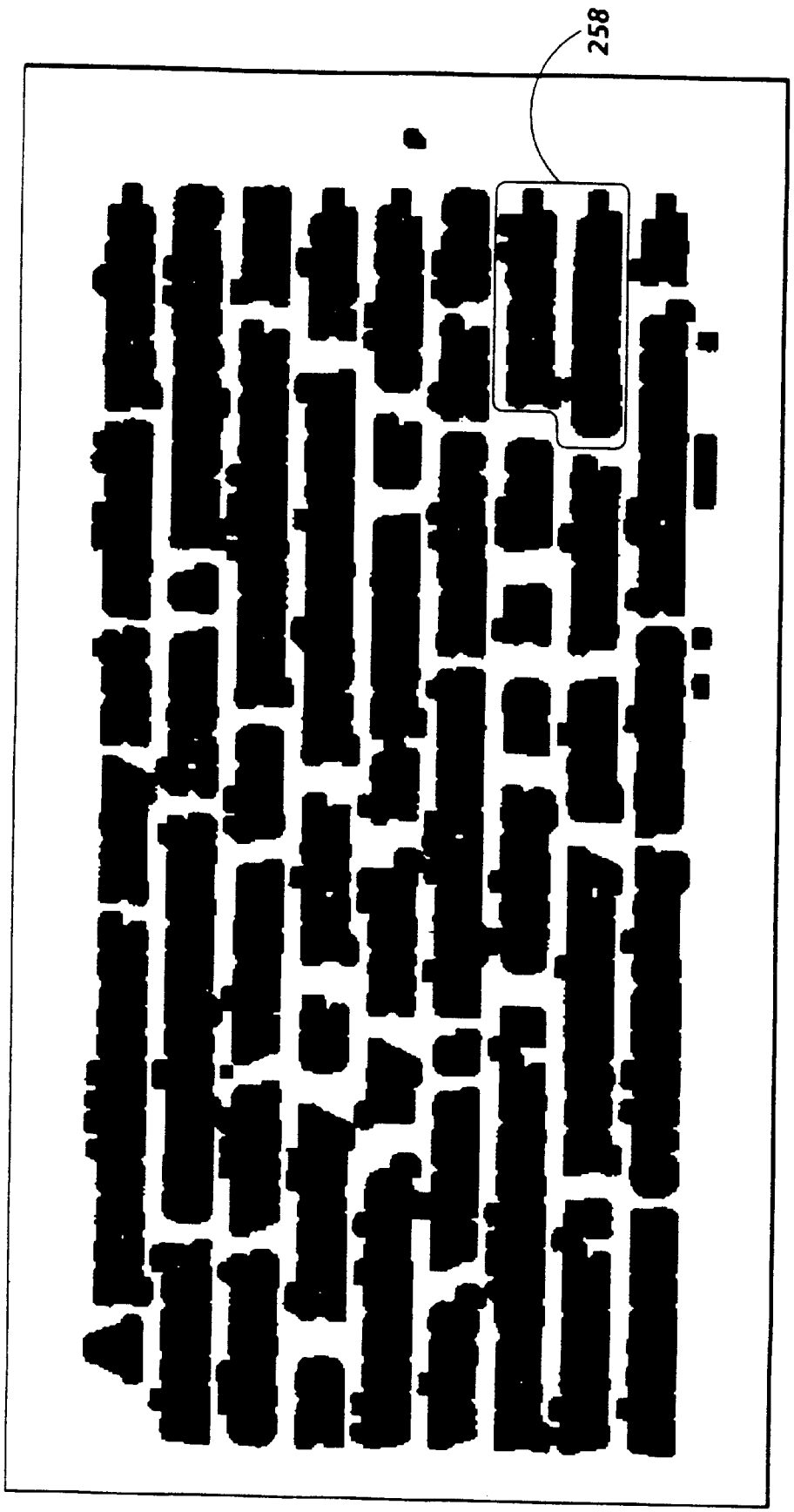
FIG. 10 demonstrates the resulting image after application of a median filter, a process known herein as blobifying, to the scanned image of the example text, which tends to render character strings as a single set of connected pixels.

As illustrated by FIG. 10, the result of the median filtering is that the relatively small spacing between characters in a word generally becomes inconsequential, and is filled with black pixels. Words become a single connected set of pixels, i.e., no white spaces completely separate characters in a single word. However, the relatively large spacing between symbol strings or between words, is outside of the ability of the filter to turn into black, and therefore serves to distinguish adjacent symbol strings. With reference now to FIGS. 7 and 10, it can be seen that the first two words of the sample text, "A" and "practitioner" have been blobified, as this process is referred to, so that, for example, the "p" of "practitioner" is no longer separated from the "r" of that word. (Compare, FIG. 3). Once again, despite the blobifying or blurring of characters, "A" and "practitioner" remain as discrete blobs of connected symbols or words.

Figure 11:
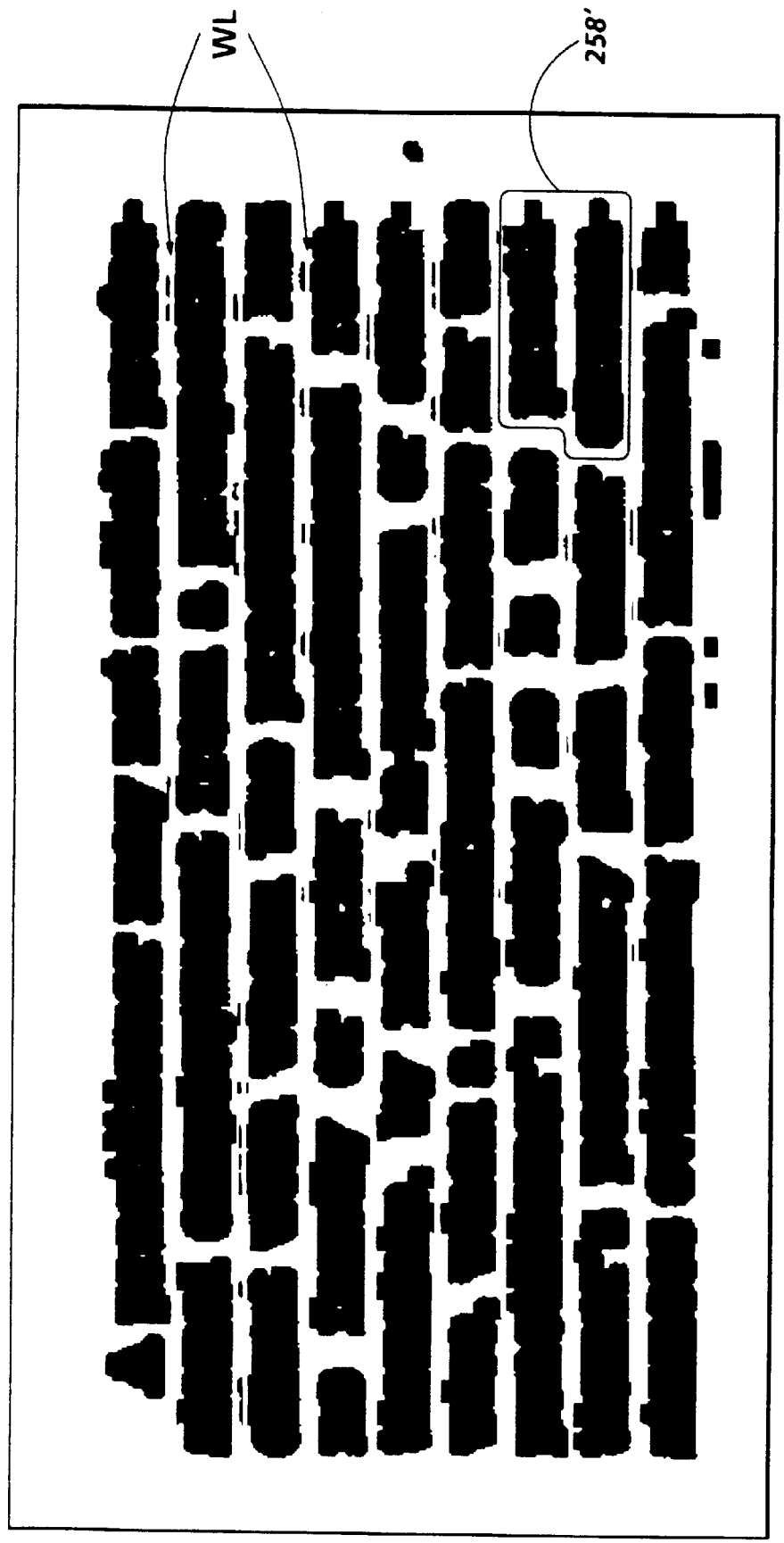
FIG. 11 shows a subsequent step in the process, in which lines of white pixels are added to the blurred image to clearly delineate a line of character strings from adjacent lines of character strings.

With reference again to FIG. 1B, as an adjunct to this step, white line addition 20, superimposes upon the blobified image of FIG. 10 a series of white pixel lines to make certain that lines of text are maintained separately from adjacent lines of text (i.e., no overlapping of the filtered text lines). This may be a redundant step, the necessity of which is caused by a mask window for the median filter that improperly fills in between text lines. On the other hand, this step may be necessitated by text which has little or no interline spacing, or leading. As an example, consider the typical newspaper article, which generally has leading or line spacing approaching zero. With reference to FIGS. 10 and 11, noting the circled areas 258 and 258', a combination of an ascender and descender has resulted in an interline merging of two words. The text line overlap illustrated in area 258 of FIG. 10 is exactly what is eliminated by superimposing the white lines on the blobified or median filtered image.

Figure 12:
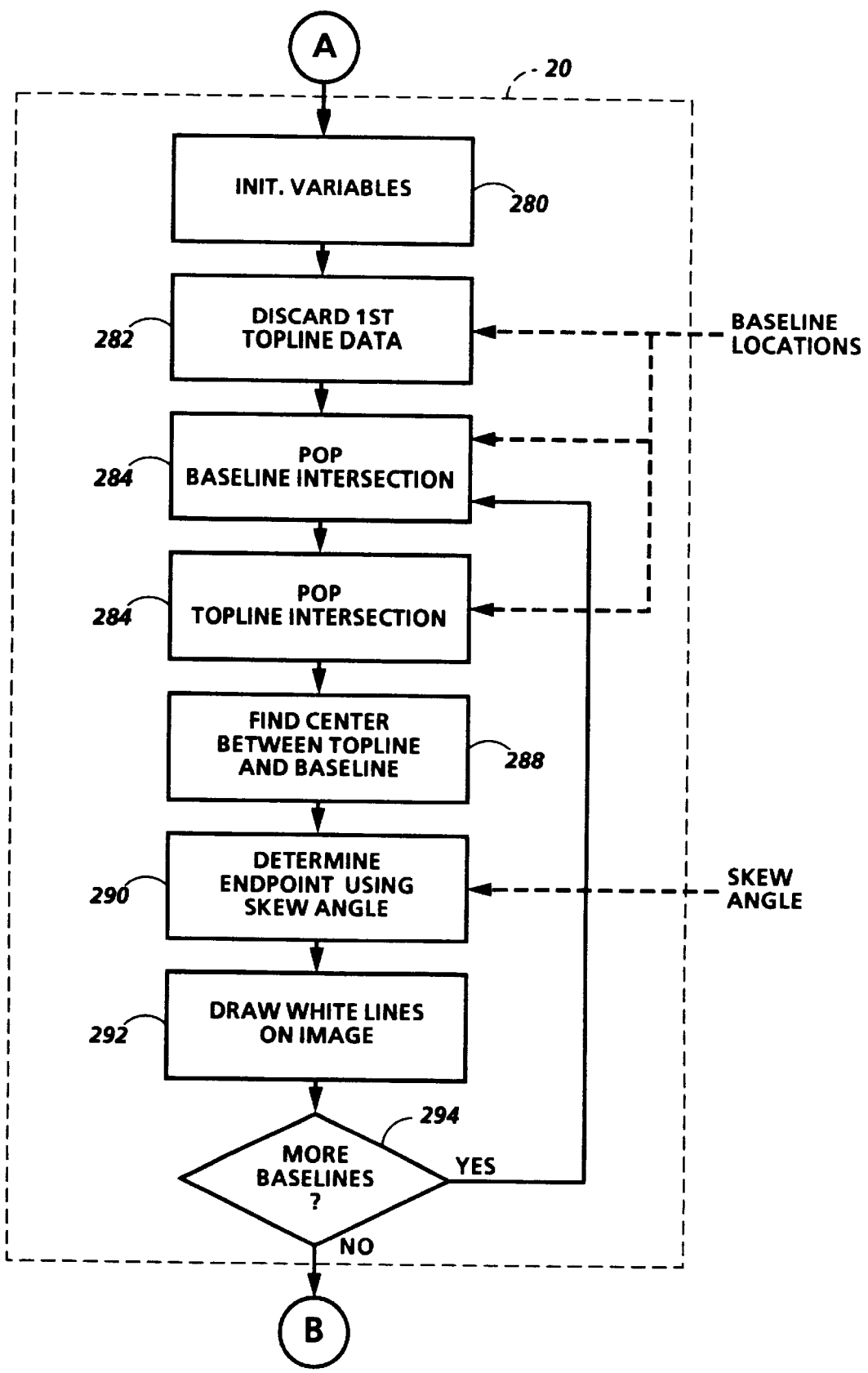
FIG. 12 is a flowchart illustrating the steps required to add the white lines of FIG. 11.

This superposition of white lines operation, the outcome of which is illustrated by FIG. 11, is carried out by the process illustrated in FIG. 12 as executed in the DrawMiddleLines( ) function (Appendix page 233). Generally, white lines WL are added to the image, approximately halfway between adjacent baseline and topline pairs, to assure that there is no cross-text line blobifying. Once again, FIG. 11 shows the result of white line addition to the blobified image of FIG. 10.

Referring now to FIG. 12, white line addition block 20 begins by initializing variables in step 280 and subsequently reads in the topline location from the baseline information of the first text line. The topline information is discarded, block 282, and the next baseline and topline locations are popped from the storage stack or list, blocks 284 and 286, respectively. With respect to the image, this baseline-topline pair respectively represents the bottom and top of adjacent text lines. Next, at step 288, the point lying at the center of the pair is located to provide a starting point for the white lines which are drawn from the center of the image in an outward direction. The endpoints of the white lines are calculated in step 290, using the skew angle determined by skew detector 14 of FIG. 1B. White lines are subsequently drawn or superimposed on the blobified image at step 292, and the process is continued until all text lines have been effectively separated, as controlled by test block 294.

With reference again to FIG. 1B, as a result of the blobify or median filtering, the position of bounding boxes about each connected set of pixels formed in the blobify step may be determined. Bounding boxes are placed only about those connected components or words that are in a text line lying between the superimposed white lines. The bounding boxes are placed at the orientation of the text line, by identifying the extreme points of each group of connected pixels in the direction of the text line, and in the direction orthogonal to the text line, as opposed to the image coordinate system. This operation is performed by the function FindBorders( ), (Appendix, page 172). Generally, the FindBorders function looks through all pixels within the image to find the bounding boxes of the connected symbols or words (Paint Component), to determine the coordinates of the upper left corner of each box, as well as the length and width of the box.

Figure 13A:
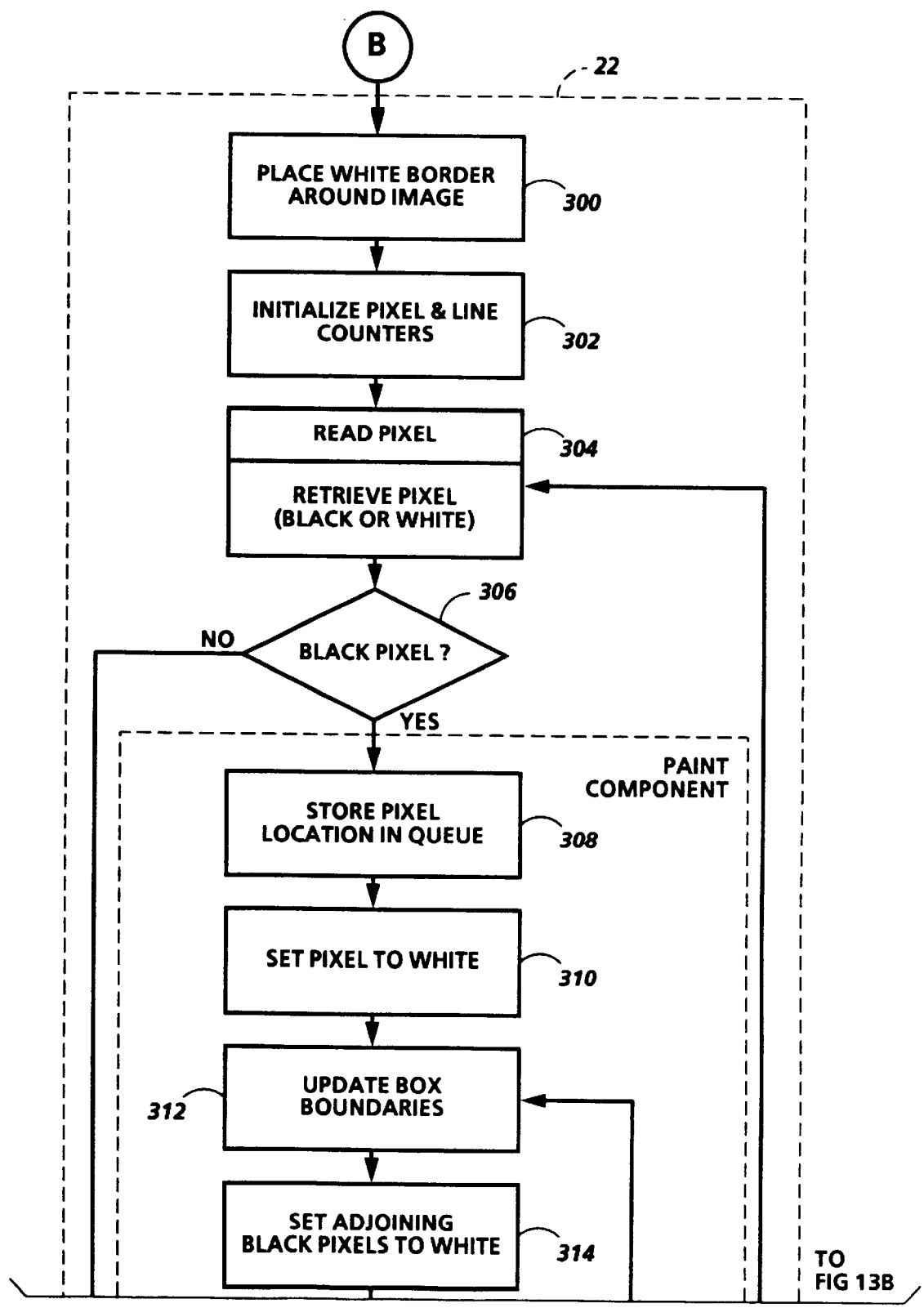
FIGS. 13A and 13B are flowcharts representing the procedure which is followed to segment the image data in accordance with the blurred image of FIG. 10.
Figure 13B:
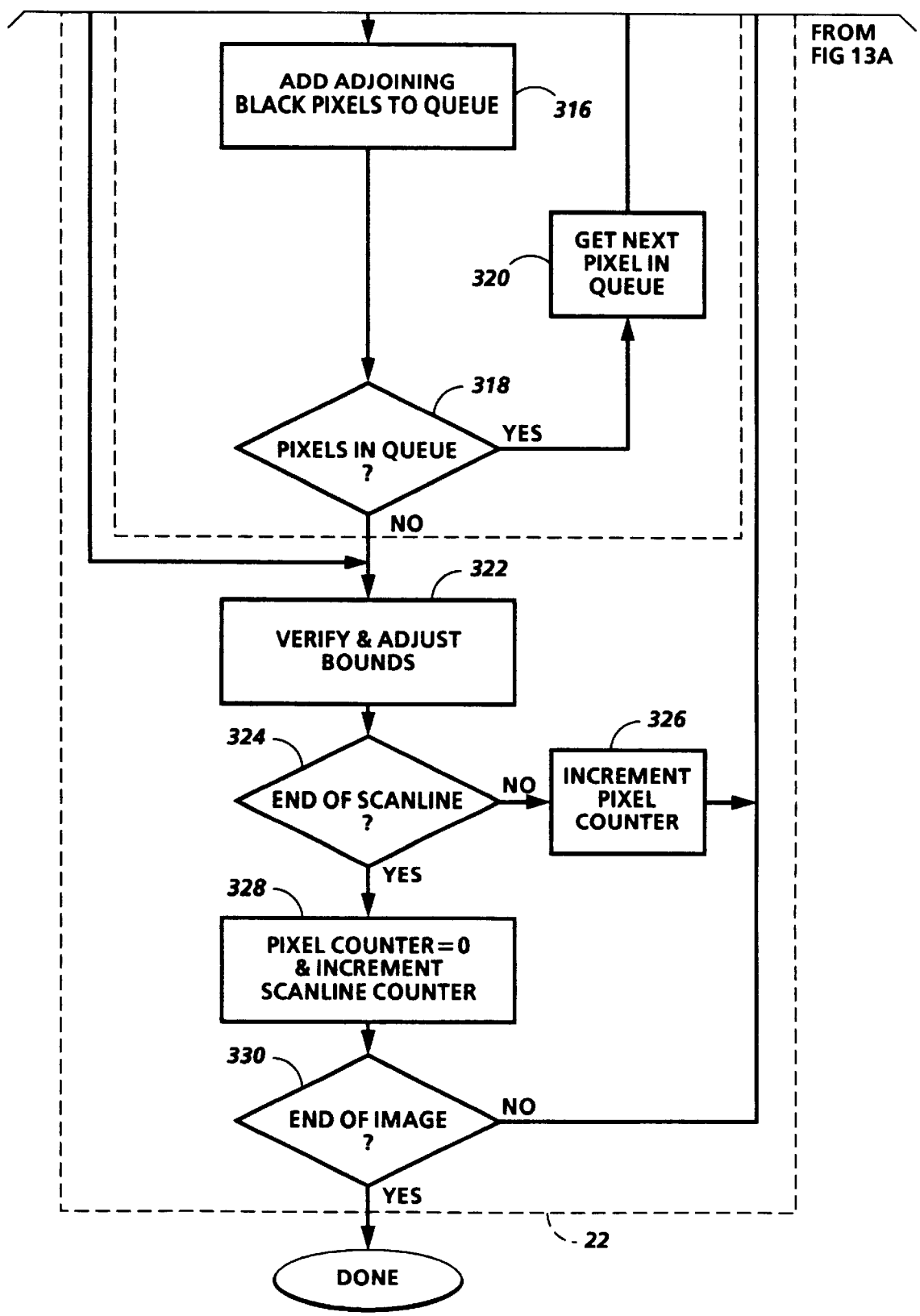

Referring now to FIGS. 13A and 13B, which detail the FindBorders( ) procedure, segmentation step 22 begins by placing a white border completely around the filtered image, step 300. This is done to avoid running beyond the bounds of the array of image pixels. Next, pixel and line counters, x and y, respectively, are initialized to the first pixel location inside the border. Calling the ReadPixel procedure, block 304, the pixel color (black or white) is returned and tested in block 306. If the pixel is white, no further processing is necessary and processing would continue at block 322. Otherwise, the PaintComponent( ) procedure (Appendix, page 171) is called and begins by storing the location of the black pixel in a queue, block 308. Subsequently, in the copy of the image, the pixel is set to white and the boundaries of the box, surrounding the connected pixels or components, are updated, blocks 310 and 312, respectively. Next, adjoining black pixels are set to white, block 314, and the locations of the black pixels are added to the end of the queue, block 316. At block 318 the queue pointers are tested to determine if the queue is empty. If not empty, the next pixel in the queue is retrieved, block 320, and processing continues at block 312. Otherwise, if the queue is empty, all of the connected black pixels will have been set to white and the box boundaries will reflect a box which encompasses the connected components. Subsequently, the boundaries of the box which encompasses the word segment are verified and may be adjusted to an orthogonal coordinate system oriented with respect to the skew of the text lines, block 322.

The looping process continues at block 324, which checks pixel counter x to determine if the end of the scanline or raster has been reached, and if not, increments the counter at block 326 before continuing the process at block 304. If the end of the scanline has been reached, pixel counter x is reset and scanline counter y is incremented at block 328. Subsequently, block 330 checks the value of scanline counter y to determine if the entire image has been processed. If so, processing is completed. Otherwise, processing continues at block 304 for the first pixel in the new scanline.

Figure 14:
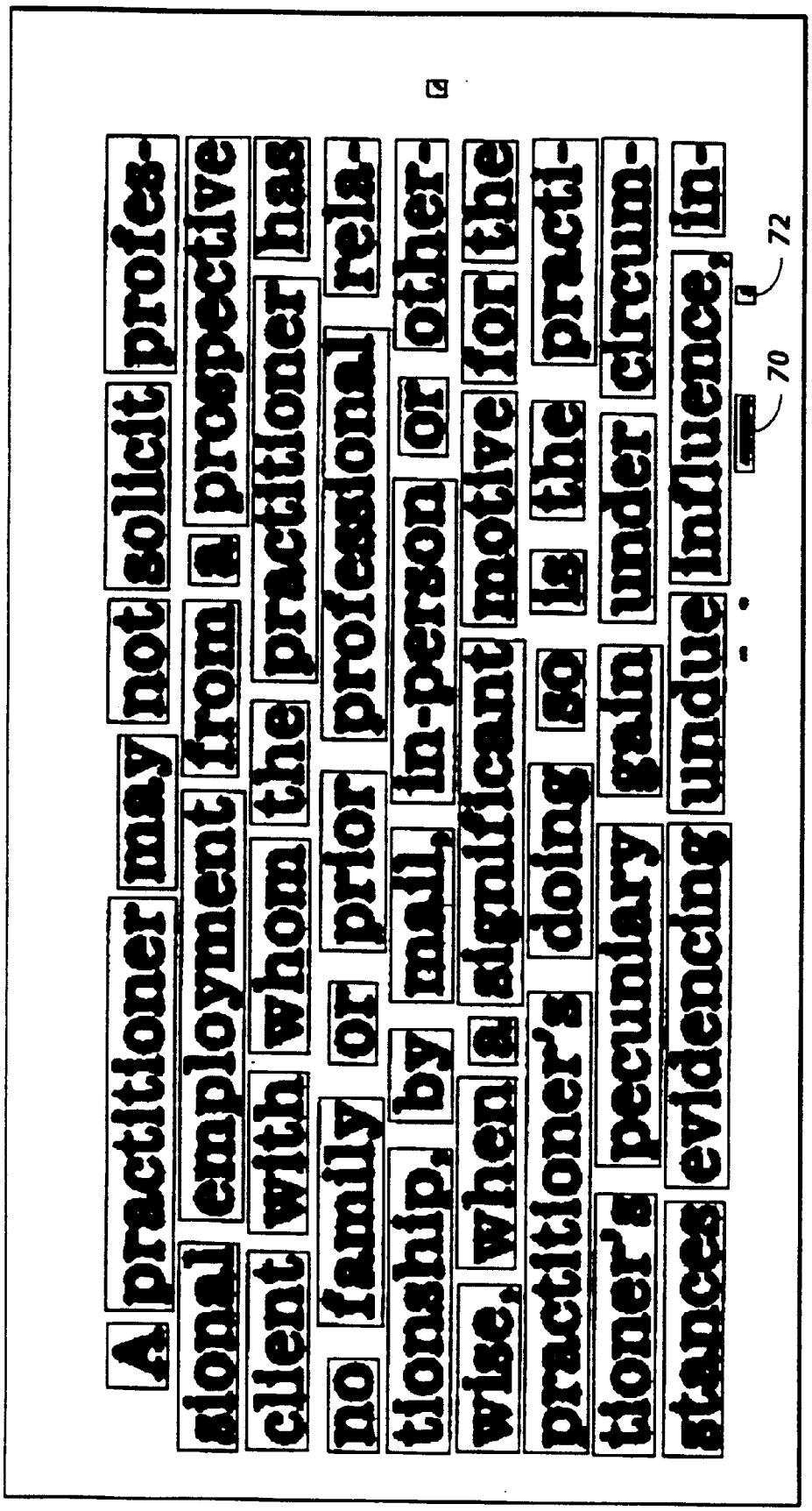
FIG. 14 shows the sample text with bounding boxes placed around each word group in a manner which uniquely identifies a subset of image pixels containing each character string.

Thus, as shown in FIG. 14, for the word "practitioner" the extremities of the connected character image define the bounding box. Once bounding boxes have been established, it is then possible at this step, to eliminate noise marks from further consideration. Noise marks are determined when: 1) a bounding box corner is outside the array of image pixels (Appendix, page 171); 2) a box spans multiple text lines in the array (Appendix 229), or lies completely outside a text line; or 3) boxes are smaller than a reference value $\epsilon$, in either or both longitudinal or latitudinal dimensions, and are accordingly discarded. Noise marks 70 and 72 and others will be not be considered words, as they are eliminated by one of the above rules. The OnABaseline( ) function (Appendix, page 229) is an example of a function used to eliminate those boxes lying outside of the baseline boundaries.

The word shape segmentation operations have been described in the context of replicating the image bitmap and thereby producing a second image which is then filtered, has white lines added and is finally used to determine the word shape boundaries. However, it may be possible to implement these operations without actually replicating the entire bitmap image. Such an approach would no doubt have advantages in a hardware implementation of the present invention, where the cost of memory sufficient to replicate entire images may be prohibitively expensive.

Figure 16:
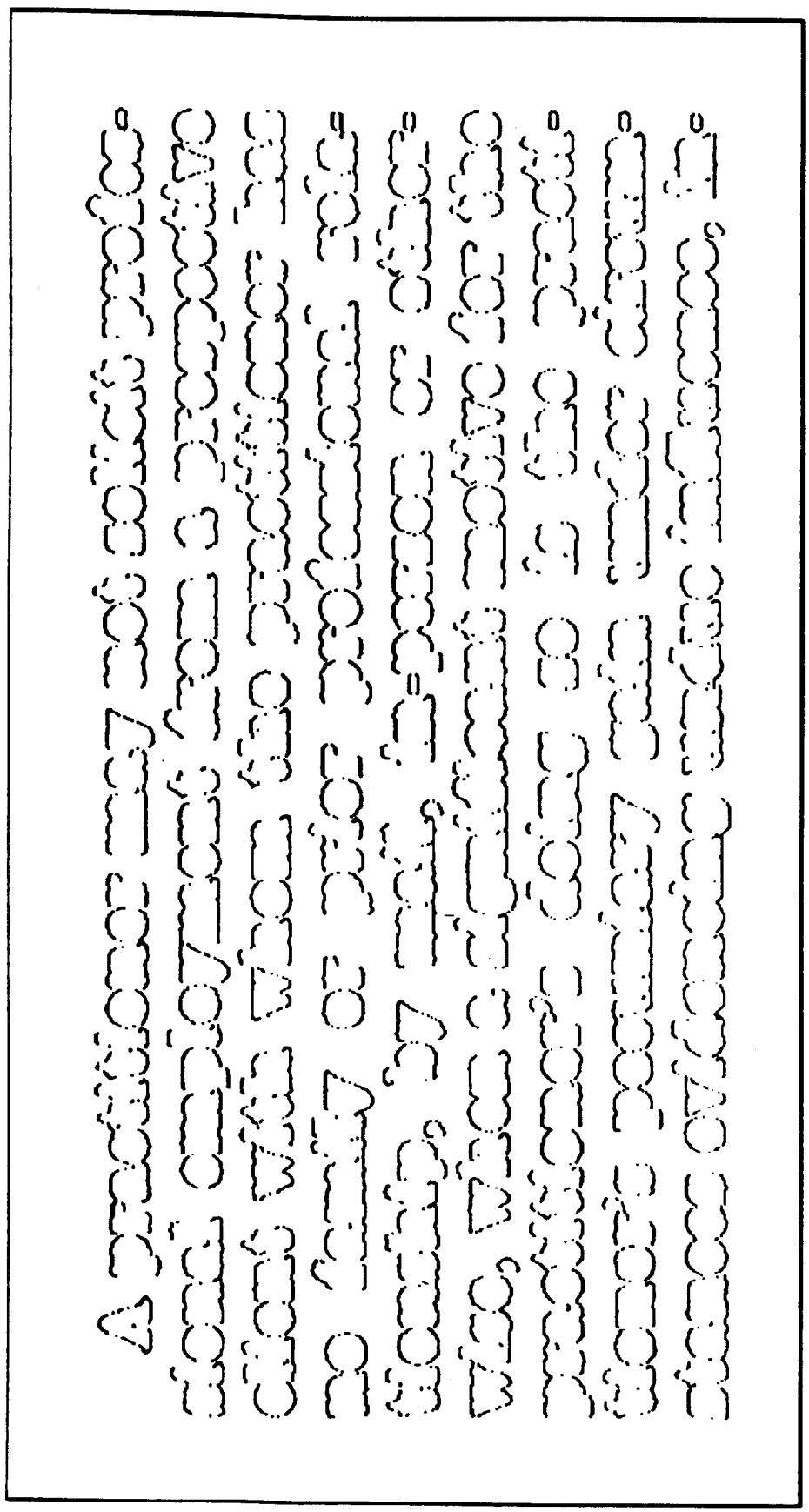
FIG. 16 illustrates the resulting contours formed by the derivation process illustrated in FIGS. 15A, B.

With reference again to FIG. 1B, at word shape computer 24, a signal representing the image of a word, or at least a portion thereof, now isolated from its neighbors, is derived. The derived signal is referred to as a word shape contour. The shape contour for each word is determined using the MakeShell( ) function (Appendix, page 228). As illustrated in FIG. 15A, this function first moves along the top of each bounding box, and starting with each pixel location along the top of the box, scans downward relative to the page orientation, until either a black pixel, or the bottom of the box, is reached. A record of the set of distances d between the top of the box and the black pixel or box bottom is maintained. The set of distances d, accumulated over the length of the box, constitutes the top raw contour of the word shape. Subsequently, a bottom raw contour is produced in a similar manner as illustrated in FIG. 15B, for the same word depicted in FIG. 15A, by sequentially moving across the bottom of the box, and looking in an upwards direction, for either the first black pixel or the top of the bounding box. FIG. 16 is an image of the contour locations as established for the text sample of FIG. 2. It is important to note the informational content of FIG. 16, where, for the most part, it is relatively easy to recognize the words within the passage by their contours alone.

Figure 17:
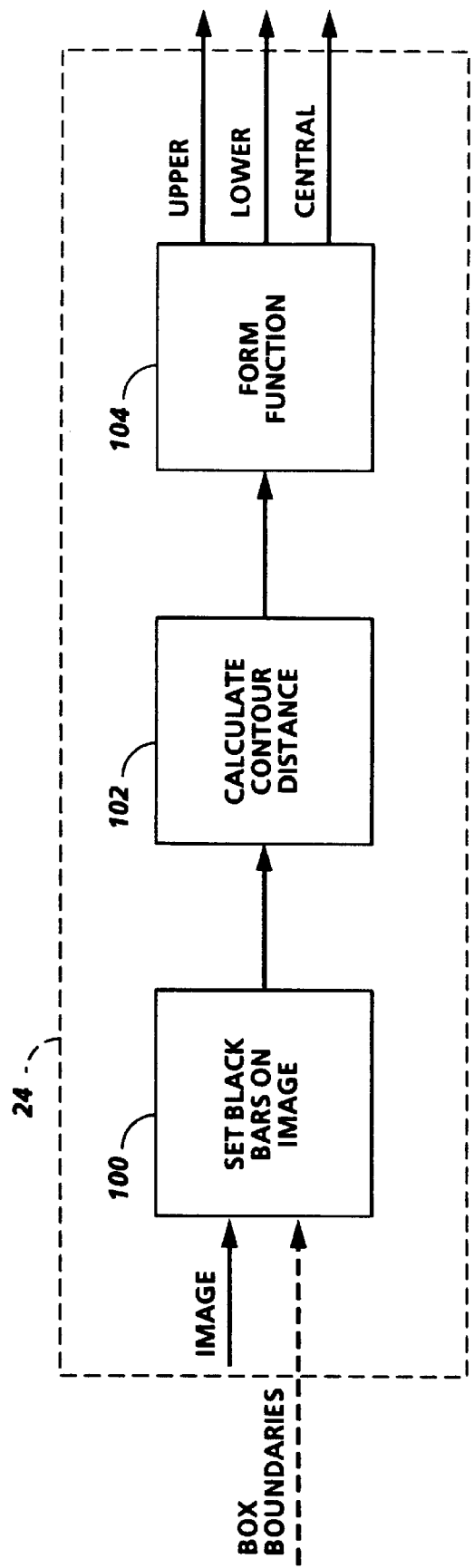
FIG. 17 illustrates the steps associated with deriving the word shape signals.

With reference now to FIG. 17, at block 100 which preferably operates on the actual image as opposed to the filtered image, which could be used in this step, one or more reference lines are established through each word. In one embodiment, a blackout bar, which may have a finite thickness or a zero thickness is constructed through the word, preferably having an upper limit or reference line at approximately two thirds of the x-height, and a lower limit at approximately one-third of the x-height. At contour calculation 102, a set of measurements is derived, for the distance d between the the upper or lower bounding box, to the word, or the nearer of the reference lines. The calculations are made at the resolution of the image. With reference to FIG. 18A, where the calculations are illustrated pictorially, it can be seen that the reference lines serve to allow the signal that will ultimately be derived from this step to be defined at every sampling position over the length of the word. In a preferred embodiment, the calculations are actually generated from the contour data previously collected, and are adjusted to limit the distance d with either the upper or lower blackout bar as indicated. In the embodiment shown, measurements are made from the upper line of the bounding box to the upper reference line, although this is not a requirement. Thus, for example, the measurement could alternatively be made from the reference line to either the upper or lower bounding line, or the character. FIG. 18B better shows how the set of measurements is used to form the signal output from block 104. The contour is represented as a distance d', relative to the reference line. Calculating the distance relative to the reference line enables scaling of the word shape contours to a common x-height, thereby facilitating any subsequent comparison of the shapes. FIGS. 18C and 18D shows that the sets of d' values can be plotted on a graph to form a single independent variable signal. Details of the contour determination are contained in the function StoreOutlinePair( beginning in the Appendix at page 255.

In studies of the information delivered by the appearance of English language words, it has been determined that in a majority of cases, words can be identified by viewing only approximately the top third of the image of the word. In other words, the upper portion of the word carries with it much of the information needed for identification thereof. In a significant portion of the remainder of cases, words that are unidentifiable by only the upper third of the image of the word, become identifiable when the identification effort includes the information carried by the lower third of the image of the word. A relatively small class of words requires information about the middle third of the word before identification can be made. It can thus be seen that a stepwise process might be used, which first will derive the upper word shape signal or contour, second will derive the lower word shape signal or contour, and thirdly derive a word shape signal central contour (from the reference line towards the word or bounding box), in a prioritized examination of the word shape, as required. In the examples of FIGS. 18A, 18B, 18C, and 18D, the word "from" is fairly uniquely identifiable from its upper portion only. In the examples of FIGS. 19A, 19B, 19C and 19D, the word "red" is less uniquely identifiable from its upper portion, since it may be easily confused with the word "rod", and perhaps the word "rad". While the lower portion of the letter "a" may distinguish "red" and "rad", it is doubtful that the lower portion of the letter "o" will distinguish the words "red" from "rod". However, the central portions of red, rad and rod are quite distinct.

Figure 20:
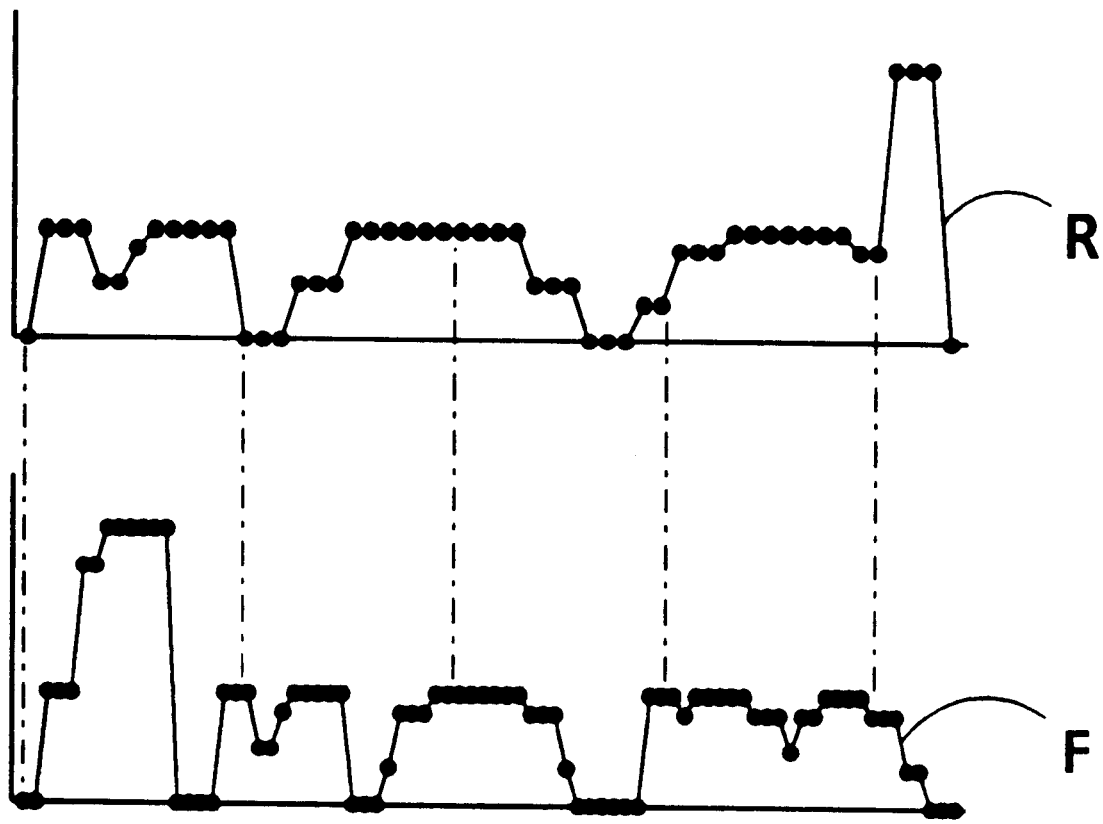
FIG. 20 shows a simple comparison of the signals derived for the words "red" and "from" using a signal normalization method.

With reference again to FIG. 1B, the next step performed is a comparison at word shape comparator 26. In one embodiment, the comparison is actually several small steps, each of which will be described. With reference to FIG. 20, generally, the two word shape signals, one a known word, the other an unknown string of characters, are compared to find out whether or not they are similar. However, in this case, signal R is the upper contour of the word "red", while signal F is the upper contour of the word "from". Actually, relatively few signals could be expected to be exactly identical, given typical distinctions between character fonts, reproduction methods, and scanned image quality. However, the word shape signals to be compared may be scaled with respect to one another, so that they have the same x-heights. This is achieved by determining the x-height of the pair of word shape contours to be compared. Once determined, the ratios of the x-heights are used to determine a scale factor to be applied to one of the contours. As the x-height is a characteristic measurement for fonts, it is used to determine the scaling factor in both the horizontal and vertical directions. An example of the scaling operation is found in the fontNorm.c file beginning at line 172, where the StoreOutlinePair( ) function carries out the scaling operation in both the x and y, horizontal and vertical, directions. Alternatively, the shape signals may be compared without normalization and a weighting factor imposed upon the portion of the measured difference due to the unequal lengths. Furthermore, the amplitude or height of the signals has been normalized to further reduce the impact of the font size on the word shape comparison.

Figure 21A:
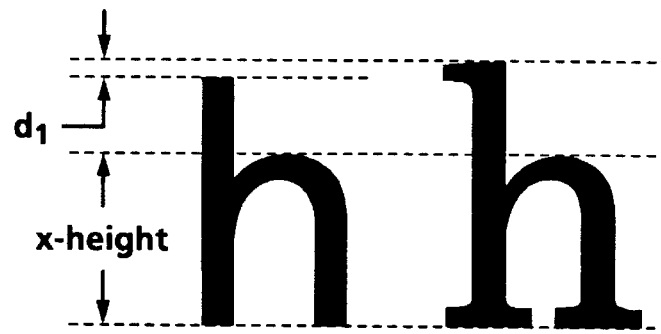
FIGS. 21A, 21B, and 21C illustrate the details of the discrepancy in font height, and the method for normalization of such discrepancies.
Figure 21B:
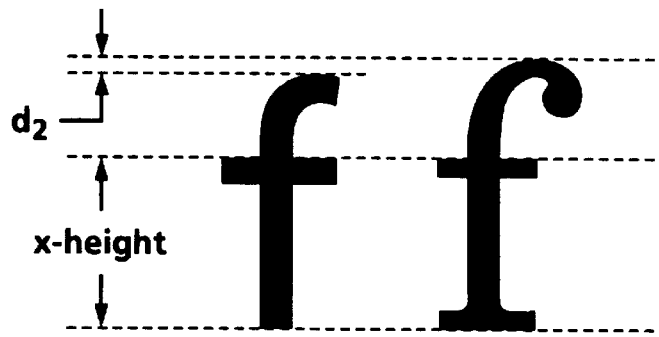
Figure 21C:

Referring next to FIGS. 21A–21C, which illustrate details of the ascender/descender normalization operation, each of the shape signals are normalized based upon a common relationship between the ascender and descender heights and the x-height of the text characters. As illustrated, the actual ascender heights of characters printed with supposedly similar font size, or what is now an appropriately scaled font size, may be slightly different. This occurs as a result of type faces or fonts which are small-on-body or large-on-body, implying that similar characters exhibit variations in height across fonts that are the same size, for example 24 point fonts. As an illustration, distance $d_1$ in FIG. 21A represents the difference in ascender height for two occurrences of the letter "h."Likewise, distance $d_2$ illustrates a similar difference between the heights of the letter "f" in FIG. 21B. As illustrated in FIG. 21C, the typical character may be broken into three sections, ascender portion 390, x-height portion 392, and descender portion 394. In addition, the relative heights of these sections are illustrated as a, c, and b, respectively. Applying the operations described with respect to StoreOutlinePair( ) function, page 255 of the Appendix, the areas of the contour lying above the x-height are scaled as follows:

$$f(t) = \frac{1.5}{a+c} \cdot f(t).$$

Similarly, the descenders are scaled by the following equation:

$$f(t) = \frac{1.5}{a+b} \cdot f(t),$$

where, in both cases, the value used in the numerator (1.5) is arrived at based upon observation of the relationship between ascender or descender heights and the x-height. Also included within the StoreOutlinePair( ) function is an operation to remove the portions of the contours which do not represent portions of the text string. These regions lie at the ends of the bounding boxes illustrated in FIG. 14. For example, the box surrounding the word "practitioner" in FIG. 14 can be seen to extend beyond the actual word image. As further illustrated at the ends of the word "from" in FIGS. 18A–18D, the contour does not contain useful information. By removing these regions from the contour shape, less error will be introduced into the comparison operations.

Subsequent to the normalization operation, standard signal processing steps can be used to determine the similarity or dissimilarity of the two signals being compared. Alternatively, the following equation may be used:

$$\Delta_{string} = \sqrt{\int_0^1 (f(x) - g'(x))^2 \, dx}$$

where
$\Delta_{string}$ is the difference value between the two signals;
f(x) is the known signal; and
g'(x) is the unknown signal.

In a simple determination, the difference could be examined and if it is close to zero, would indicate that there was almost no difference between the two signals. However, the greater the amount of difference, the more likely that the word was not the same as the word to which it was being compared.

It is important to note that the embodiments described herein, as supported by the code listings of the Appendix, compare the word shape contours using the upper and lower contours for each word in conjunction with one another. This is an implementation specific decision, and is not intended to limit the invention to comparisons using only the top and bottom contours in conjunction with one another. In fact, sufficient information may be contained within the upper contours alone so as to significantly reduce the requirements for a comparison of the lower contours, thereby saving considerable processing effort.

Figure 22:
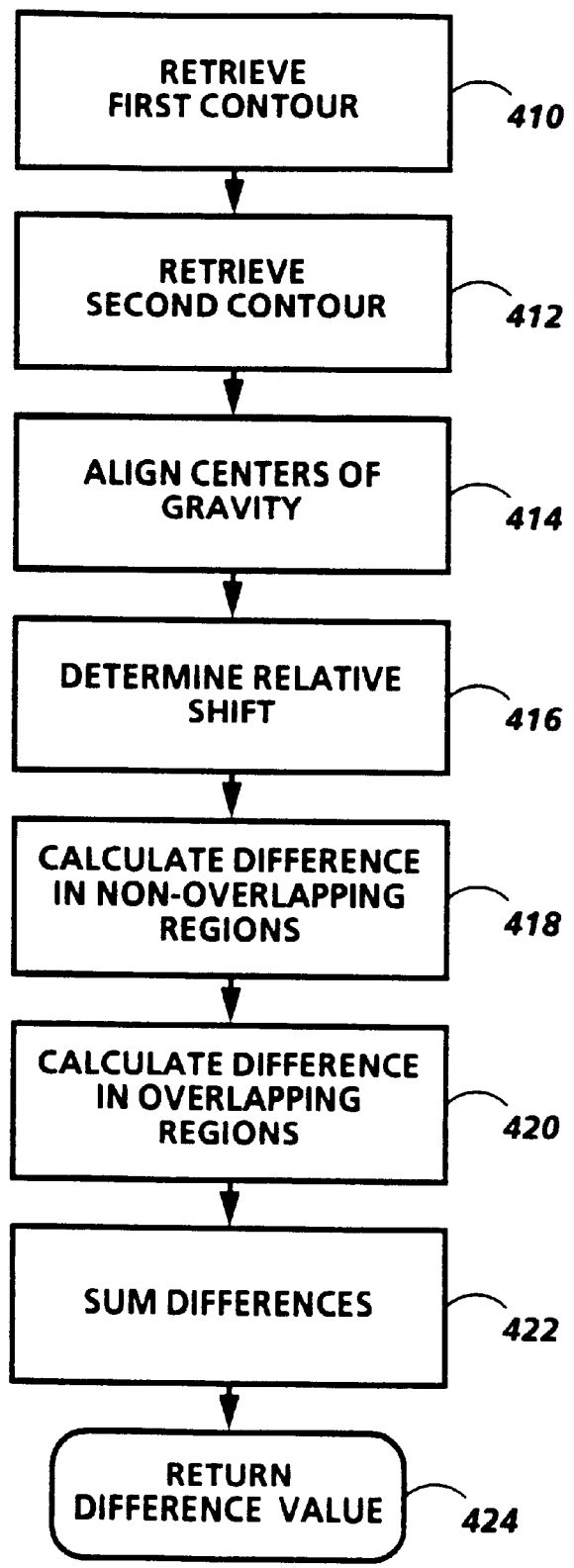
FIG. 22 is a flowchart detailing the steps used for one method of determining the relative difference between word shape contours.

The steps of this simplified comparison method, as first contemplated, are illustrated in FIG. 22. Beginning at step 410, the contour for the first word shape is retrieved from memory, and subsequently, the second word shape is retrieved by step 412. Next, the centers-of-gravity of the word shapes, defined by the upper and lower contours, are determined and aligned, step 414. The purpose of this step is to align the centers of the word contours to reduce the contour differences that would be attributable solely to any relative shift between the two sets of contours being compared. The center-of-gravity may be determined by summing the areas under the curves (mass) and the distances between the contours (moments) which are then divided to give an indication of the center-of-gravity for the upper and lower contour pair or by other standard means for determining the center-of-gravity for arcs. Once determined for both sets of contour pairs, the relative shift between the pairs is determined, step 416, and the contours are shifted prior to calculating the difference between the contours. The shifting of the contours is necessary to reduce any error associated with the establishment of the word shape boundaries and computation of the word shapes at block 24 of FIG. 1B. Step 418 handles those regions lying outside the overlapping range of the shifted contour pairs, determining the difference against a zero amplitude signal in the non-overlapping regions. This is done by summing the squared values of the upper and lower contours at the non-overlapping ends of the contours. Subsequently, the overlapping region of the contours are compared, step 420. The difference in this region is determined as the sum of the squared differences between the upper curves and the lower curves, as shown in the function L2Norm( ) on page 100 of the Appendix. Next, the values returned from steps 418 and 420 are added to determine a sum of the differences over the complete range defined by the shifted contours. This value may then be used as a relative indication of the similarity between the contour pairs for the two word shapes being compared.

An alternative to the center-of-gravity comparison method, uses a signal processing operation known as time warping, as described in the article "Performance Tradeoffs in Dynamic Time Warping Algorithms for Isolated Word Recognition", by Myers, Rabiner, and Rosenberg, IEEE Transactions on Acoustics, Speech, and Signal Processing, Vol. ASSP-28, No. Dec. 6, 1980, and the book, "Time Warps, String Edits, and Macromolecules: The Theory and Practice of Sequence Comparison", by Sankoff and Kruskal, Addison-Wesley Publishing Company, Inc., Reading, Mass., 1983, Chapters 1 and 4, both specifically incorporated herein by reference, which may be used to provide for compression and expansion of points along the contours until the best match is made. Then a score is derived based on the amount of difference between the contours being compared and the stretching required to make the contours match. Once again, the score providing a relative indication of the match between the two signals being compared.

Figure 23:
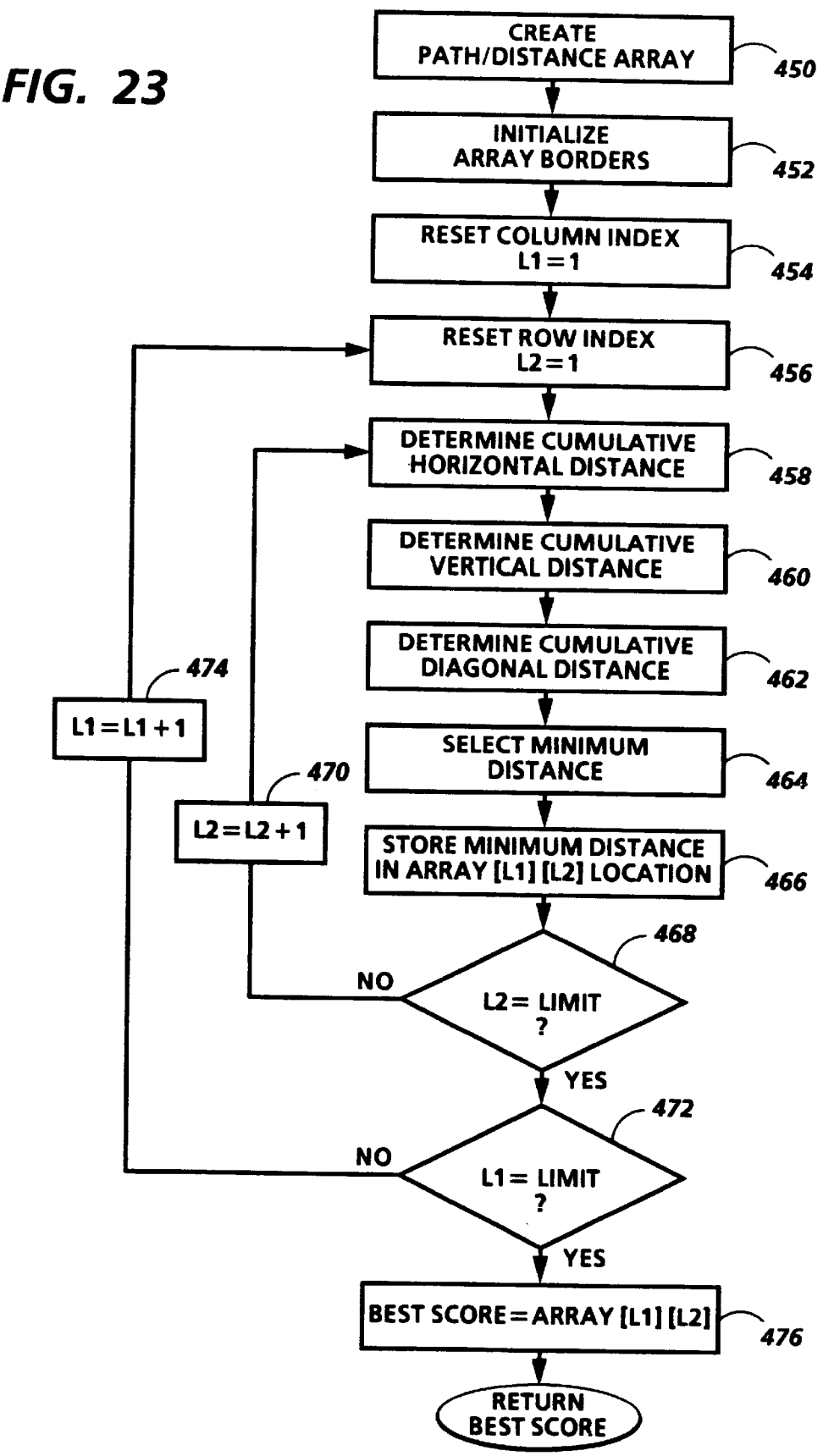
FIG. 23 is a flowchart detailing the steps of a second method for determining the relative difference between word shape contours.

Referring now to FIG. 23, which depicts the general steps of the dynamic warping method, the method relies on the use of a difference array or matrix to record the distances between each point of the first contour and points of the contour to which it is being compared. As illustrated in the figure, and detailed in the code listings contained in the Appendix, the process is similar for all of the measures which may be applied in the comparison.

First, the organization of the code is such that a data structure is used to dynamically control the operation of the various comparison functions. The structure DiffDescriptor, the declaration for which is found on page 9 of the Appendix (see diff.h), contains variables which define the measure to be applied to the contours, as well as other factors that will be used to control the comparison. These factors include: normalization of the contour lengths before comparison; separate comparisons for the upper and lower contours; a centerWeight factor to direct the warping path; a bandwidth to constrain the warp path; a topToBottom ratio which enables the top contour comparison to be weighted more or less with respect to the bottom contour comparison; and a hillToValley ratio to selectively control weighting the contour differences when an unknown contour is being compared to a known or model word shape contour. Interpretation of the various factors is actually completed in the diff2.c module at page 56 of the Appendix, although descMain.c at page 49 provides an illustration of the interpretation of the factors.

In general, each measure implements a comparison technique, however, each is optimized for a specific type of dynamic comparison, for example, a slope limited dynamic warp having a non-unitary centerWeight and a topToBottom weight greater than one. The first level of selection enables the use of a slope-constrained warping function for comparison, an unconstrained warp, or a simple, non-warped, comparison. Within both of the warp comparison methods, there are both separate comparison functions, where the top and bottom contours are warped independently, and parallel comparison functions, where the warp is applied to both the top and bottom contours simultaneously. Specific details of the comparison functions are generally contained within the newMatch.c file beginning at page 101 of the Appendix.

In the general embodiment, the dynamic warping process starts by allocating space for the path/distance array, step 450, which will hold the distance values generated during the comparison and warping of one word shape contour with respect to another. In general, this array would be used to identify all possible difference measures for the contours being compared. Subsequent to filling the array elements with difference values, the array would be traversed, from one corner to the diagonally opposite corner, while accumulating the difference values for all elements within the traversal path. The embodiment which has been described optimizes this process somewhat by iteratively filling in the accumulated difference value as the difference values are determined. Essentially, this eliminates the redundant step of traversing the array once all the relative difference values between the contour have been calculated. Finally, the listings contained in the Appendix illustrate a further modification where the large array is eliminated and replaced by a pair of linear arrays that are manipulated to store, retrieve, and update the distance values during the "traversal" of the array.

After allocating space, the border regions of the array must be initialized as the process used by all the warping measures is an iterative process using data previously stored in the array for the determination of the cumulative difference between the contours. At step 452, the array borders are initialized. Initialization of the first row of the array entails the determination of the square of the difference between a first point on the the first contour and each point on the second contour. Subsequent to border initialization, the column and row index values, l1 and l2, respectively, are reset to 1 to begin processing the individual, non-border, points along the contours.

Figure 24A:
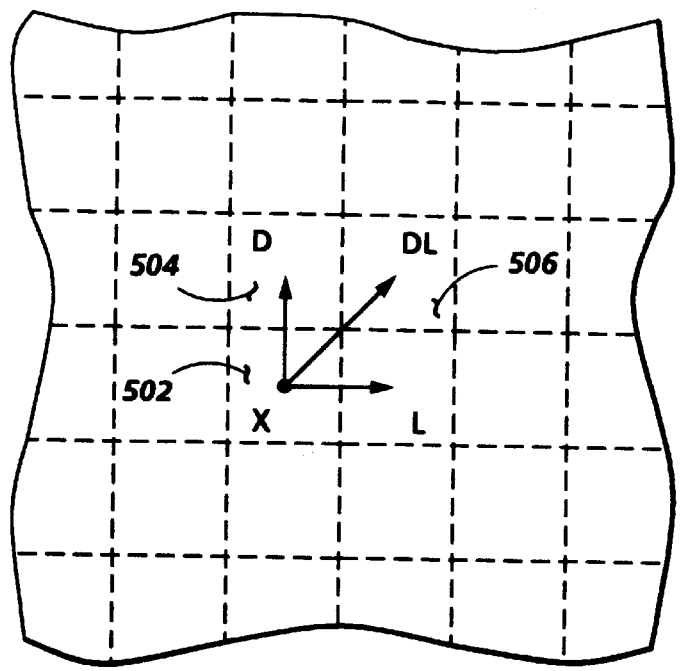
FIGS. 24A and 24B are respective illustrations of the relationship between the relative difference values calculated and stored in an array, for both a non-slope-constrained and a slope-constrained comparison.

Processing of the contours proceeds at steps 458 through 464, where the difference in distance between each point along the second contour, with respect to a point on the first contour is calculated. Moreover, this difference, or distance, is calculated and then summed with a previously determined difference value. In addition, some of the previously determined difference values may be weighted differently, for example, in one embodiment weights of the difference values along the array diagonal may be modified by a centerWeight weighting factor. As an illustration, consider the operation of the NewMatch( ) function, beginning at line 106 on page 103, at first, the distance (rest) is calculated as the sum of the squares of the differences between a point on the first contour and a point on the second contour, over the upper and lower contours, where the top contour difference is weighted by the topToBottom variable. This distance (rest) is used in subsequent iterations to determine the horizontal, vertical and diagonal difference values in the loop beginning at line 137 on page 103. To determine each of these values, the current distance value, represented by rest, would be added to the previous values in the down, left, and down-left array positions, the down-left position value being the diagonal position which is weighted by the centerWeight factor as previously described. Referring to FIG. 24A, which illustrates the positional relationship between a previously determined value X, at array location 502, and subsequent array locations, the value X might be added to the difference values of subsequent locations to accumulate the total difference. When calculating the difference value for array location 504, The value in location 502 would be used as the down value. Similarly, when calculating the value in location 506, the value of location 502 would be used as the center-weighted down-left, or diagonal, value. After calculating the three difference values, steps 458, 460, and 462, the process continues by selecting the smallest of the three values, step 464, for insertion into the the current array position, step 466. As illustrated in the Appendix at line 144 of page 103, the FMin( ) function from page 101 returns the minimum of the three values previously calculated, the value being inserted into the storage array pointed to by pointer dc.

Subsequently, the process illustrated in FIG. 23 continues by determining the differences between the point on the first contour, represented by l1, to points on the second contour, represented by l2. Decision step 468 controls the iterative processing of the points along the second contour by testing for the end of the contour, or swath. In the case of a limiting swath or bandwidth, the domain of one or both of the contour regions being compared is restricted to a subset of the regions over which the contours are defined. In the implementation shown in the Appendix, the index variables i and j are used in place of l1 and l2 to control the difference calculation loops. As indicated in the code for the NewMatch( ) function beginning on page 102 of the Appendix, the swath is referred to as the bandwidth, and is determined by a desired bandwidth which is adjusted for the slope defined by the contour lengths (see page 102, lines 83–89). If no limit has been reached, processing for the next point would continue at step 458 after the value of l2 was incremented at step 470. Similarly, decision step 472 controls the processing of each point along the first contour, in conjunction with incrementing step 474. Once all the points have been processed with respect to one another, as evidenced by an affirmative response in step 472 indicating that the array has been traversed, the relative difference score, best score, is contained in the farthest diagonal position of the array (l1,l2). Subsequently, the value determined at step 476 is returned as an indication of the dynamically warped difference between the contours being compared.

The code implementation found in the NewMatch( ) function on page 103 of the Appendix has optimized the execution of the aforedescribed warping process by reducing the large two-dimensional array to a pair of linear arrays which are updated as necessary. Due to this modification, the minimum difference, or best score, for the the warp comparison value is found in the last location of the one-dimensional array. Furthermore, the final difference value, dc, may be subsequently normalized to account for the length differences between the two sets of contours being compared. Finally, such a value might subsequently be compared against a threshold or a set of similarly obtained difference values to determine whether the contours are close enough to declare a match between the words, or to determine the best match from a series of word shape comparisons.

In yet another embodiment, the dynamic time warping process previously described may be altered to compare the difference values contained in the difference array to a threshold value on a periodic basis. Upon comparison, the process may be discontinued when it is determined that sufficient difference exists to determine that the contours being compared do not match one another, possibly saving valuable processing time. Moreover, the sequential operation of word shape comparator 26 might be done in conjunction with sequential output from word shape computer 24, thereby enabling the parallel processing of a textual image when searching for a keyword.

Having described a basic implementation of the dynamic warping comparison measures, the distinctions of the other dynamic warp comparison methods included in the Appendix and the application of the control factors previously mentioned will be briefly described to illustrate the numerous possible embodiments of the present invention. First, the dynamic warping method previously described may also be implemented with the slope of the the warp path being constrained as it moves across the array. Details of the implementation are found in the SlopeCMatch( ) function beginning on page 111 of the Appendix. This measure is further illustrated graphically in FIG. 24B, where the value of array location 512, X, may be added to only the three subsequent array locations shown. For example, X may be added to array location 514, when considered as the d2l1 value for location 514. The nomenclature used for the variable names within the code listing, and followed in the figure, is as follows: d2l1 refers to the array location which is down 2 rows and left one column; dl1l refers to the lower left diagonal array location; and d1l2 refers to the array location that is down one column on left 2 rows from the current array location. In a similar manner, X may be added as the d1l2 value for the calculation of the cumulative difference value for array location 516.

Figure 24B:
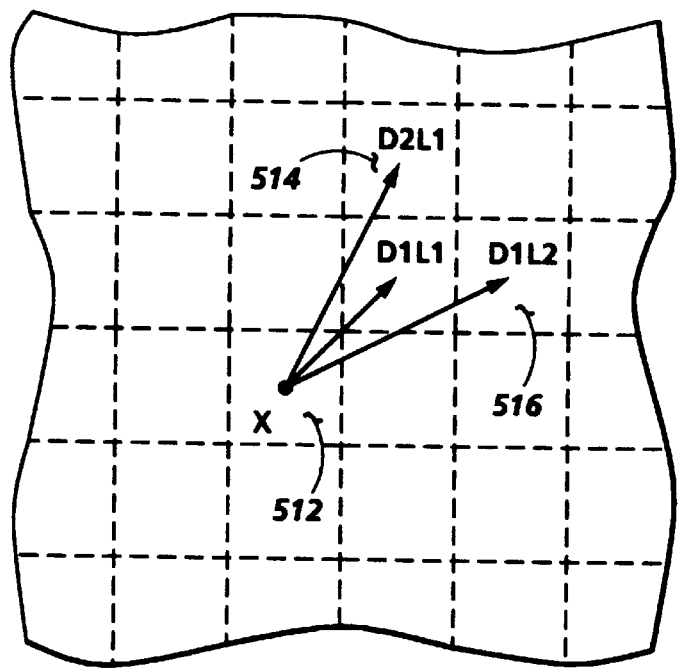

As is apparent from a comparison of FIGS. 24A and 24B, the slope constrained warping measure limits, on a local scale, the warping path which can be followed during the generation of the cumulative difference value. The reason for implementing such a constraint is to prevent the warping process from removing, or compressing, a large area of one of the two contours being compared, without imposing a significant "cost" to such a compression.

Next, the method previously described with respect to the parallel warping process may also be implemented on only one pair of contours at a time, for example, the upper contours of two word shapes. The functions SepMatch( ) and SepCMatch( ), as found in the Appendix on pages 104 and 113, respectively, implement the separate matching measure in both the non-slope-constrained and slope-constrained fashions previously described. In general, these measures separately calculate the difference between the top or bottom contours of a pair of word shapes. The general implementation indicated for the measures in the code shows that these measures are typically used sequentially, first determining the warped difference for the top contours, and then adding to it the warped difference from the bottom contour comparison, resulting in a total difference for the word shapes.

By carrying out the comparison methods described in a "piece-wise" cascaded fashion, further processing benefits may also be derived. More specifically, cascaded comparison would entail, first, utilizing the upper contours of the words being compared to identify a word, or at least narrow the set of possible alternatives and, second, using the lower contour comparison to provide complete identification. It is believed that such an approach to word shape comparison operation 26 would considerably reduce processing time spent on identifying unknown word shapes by comparison to a dictionary of known word shapes, 28, as illustrated in FIG. 1B. Important to the cascaded comparison, is the constraint that the top and bottom warps applied to the contours must be relatively equivalent. This requirement arises from the fact that the upper and lower curves have a relationship to a common word, and if this relationship is not maintained during the warp analysis, the accuracy of the comparison will be compromised.

Some of the aforementioned factors which also control the comparison process are: bandwidth, topToBottomratio, and hillToValley ratio. The extensions which these factors control will be described briefly, while, the specific implementation of these controls is described in a copending U.S. Patent Application, for a "Method for Comparing Word Shapes", Huttenlocher et al., Ser. No. 07/795,169, which has been previously incorporated herein by reference.

The bandwidth factor controls the relative width of the signal band in which the warping signal will be constrained. More specifically, the band width limitation is used to define a region about the array diagonal in which the warp path which traverses the array is constrained. Generally, the constraint is implemented by assigning large values to those areas outside of the band width, so as to make it highly unlikely that the path would exceed the constraint. When applied, the topToBottom ratio is used to weight the difference value determined for the top contour warping process. Thus, using a number greater than one for this variable will cause the upper contour difference to be weighted more heavily than the lower contour difference. For example, a very large number would effectively eliminate the lower contour difference completely and, likewise, a zero value would eliminate the upper contour difference completely. This factor is generally considered important to enable the upper contour to be weighted in proportion to its information content, as it generally carries more information regarding the word than does the lower contour. Finally, the hillToValley ratio is applicable in situations when a known, or model, set of word shape contours is being compared against a set of word shape contours from an unknown image. The result of applying a hillToValley value greater than one is that, the relative "cost" of the difference when the model contour is less than the target contour is smaller than the same difference when the model contour is greater than the target contour. The basis for weighting the comparison in this fashion is that when comparing against a model contour, the comparison should treat those areas of the target contour that are subject to being "filled-in" during a scanning or similar digitizing operation with less weight than regions not likely to be filled in, as evidenced by contour positions below the model contour. Therefore, the hillToValley variable attempts to minimize the impact to the calculated difference value over these filled-in regions.

It is important to note that the aforedescribed measures and control factors allow the comparison measures to be conducted in numerous permutations. However, the flexibility which these measures permit is intended to enhance the applicability of the comparison process, so that when information is known about a particular word shape contour, for example, a model contour generated from a computer generated character font string, the measures may place reliance on that information to make the comparisons more robust.

The invention has been described with reference to a preferred embodiment, namely a software implementation designed to be implemented in a computer system, employing one or more microprocessor or arithmetic processing devices for the execution of predefined instructions, to achieve the operations hereinbefore described with respect to processing of the digital signal data. In addition, the invention may also be achieved using specialized hardware which is designed to implement the operations described herein. Furthermore, the invention has been described as a portion of a larger word recognition system. However, as previously noted, the present invention has the potential for use in text and word editing, or related systems. Practically speaking, any system requiring the isolation of discrete word objects, characterization of text parameters, or removal of extraneous marks, might utilize the present invention. Finally, the invention has been described with respect to textual images. However, this invention would also be applicable for images that include non-textual image portions as well. Obviously, modifications will occur to others upon reading and understanding the specification taken together with the drawings. This embodiment is but one example, and various alternatives, modifications, variations or improvements may be made by those skilled in the art from this teaching which is intended to be encompassed by the following claims.

What is claimed is:

1. A method of isolating a word object composed of multiple adjacent symbols within data defining a first image, comprising the steps of:

(a) producing a second image, as a function of the first image, where the adjacent symbols which form the word object are represented in the second image as having at least one point of contact between one another, thereby representing the word object as a group of connected symbols;

(b) locating the connected symbols within the second image;

(c) identifying boundaries about each group of connected symbols within the second image, so as to segment the second image by word objects; and (d) applying the boundaries identified in step (c), to the first image to group the data associated with each word object, thereby isolating the word object within the data defining the first image.

2. The method of claim 1, further comprising the step of determining a skew angle corresponding to the orientation of the word object within the data defining the first image, wherein the step of identifying boundaries about each group of connected symbols orients the boundaries with respect to the skew angle.

3. The method of claim 2, wherein the boundaries about each group of connected symbols are rectangular in shape and have two principal dimensions, further comprising the steps of:

(a) locating characteristic lines of the word object, said characteristic lines being oriented with respect to the skew angle; and (b) removing, from the data defining the first image, extraneous marks, said extraneous marks being identified as such based upon an analysis of the principal dimensions of boundaries surrounding the extraneous marks with respect to said characteristic lines.

4. The method of claim 1, further comprising the steps of:

(a) determining a skew angle corresponding to the orientation of the word object within the data defining the first image;

(b) locating characteristic lines of the word object, said characteristic lines being oriented with respect to the skew angle; and (c) altering the second image, by superimposing interline boundaries, based upon the locations of said characteristic lines, between respective upper and lower word objects present within the second image, thereby imposing a separation between word objects lying on adjacent text lines.

5. The method of claim 3, wherein the step of identifying the locations of characteristic lines for the word objects comprises the steps of:

(a) constructing a first line through the image, said first line being composed of a plurality of discrete points and oriented in a direction perpendicular to the orientation of the word object, as defined by the skew angle;

(b) projecting the data defining the first image onto said first line, to produce an indication of the frequency of occurrence of symbol extents within the projected data as a function of the displacement along the line; and (c) identifying the locations of local maxima within the projected data, wherein the maxima are representative of the characteristic lines for the word objects lying along symbol lines.

6. The method of claim 3, wherein the step of identifying the locations of characteristic lines for the word objects comprises the steps of:

(a) constructing a line through the image, said line being composed of a plurality of discrete points and oriented in a direction perpendicular to the orientation of the word object, as defined by the skew angle;

(b) projecting the data defining the first image onto said line, to produce a signal representative of the frequency of the projected data as a function of the displacement along the line;

(c) identifying local maxima and minima of the signal;

(d) applying a threshold to said signal, in order to enable the classification of the local maxima and minima; and (e) identifying text characteristic lines as those lines which exhibit local maxima above the threshold.

7. The method of claim 6, further comprising the step of identifying text toplines as those local maxima which are the first rising maxima after a falling minima.

8. The method of claim 6, further comprising the step of identifying text baselines as those local maxima which are the second rising maxima after a falling minima.

9. The method of claim 6, further comprising the steps of:

separating the text characteristic lines into pairs of lines, each pair representing a topline and baseline for a line of text; and verifying the validity of the text characteristic line pairs by calculating the average separation of the text characteristic line pairs, and discarding any line pairs having a separation less than the average separation.

10. The method of claim 1, wherein the step of producing a second image, as a function of the first image, comprises the step of applying a median filter to the first image, thereby producing a second image having a blurred representation of the first image.

11. A method of determining bounding reference lines for at least one word object within data defining a first image, comprising the steps of:

(a) determining a skew angle representative of the orientation of the word object within the data defining the first image;

(b) blurring the data defining the first image, thereby producing a second image where adjacent components which make up the word object are caused to become connected to one another, the connected components consisting of a plurality of like-valued data elements having positions within the second image that adjoin one another;

(c) locating the connected components of the second image;

(d) identifying bounding reference lines about each group of connected components within the second image, so as to segment the second image by word objects, said bounding reference lines being oriented with respect to the skew angle; and (e) applying the bounding reference lines identified in step (d), to the first image to produce bounding reference lines for the word object within the data defining the first image.

12. The method of claim 11, wherein the step of locating the connected components of the second image comprises the steps of:

(a) finding a data element, within the second image, representative of a black input regions;

(b) storing the coordinate location of the element in a queue;

(c) setting the value of the data element to a value representative of a white input region;

(d) detecting adjoining data elements, within the second image, which are also representative of black input regions;

(e) storing the coordinate locations of adjoining data elements detected in step (d) in the queue;

(f) setting the value of the data elements detected in step (d) to a value representative of a white input region;

(g) continuing the process at step (d) for each data element in the queue; and (h) continuing the process at step (a) until all data elements within the second image have been processed.

13. The method of claim 12, wherein the step of identifying bounding reference lines about each group of connected components further comprises the steps of:

(a) retrieving the coordinate locations stored within the queue;

(b) identifying relative maxima and minima coordinate locations, thereby identifying the boundaries of the connected components; and (c) constructing bounding reference lines through the relative maxima and minima to enclose the connected components.

14. A method of isolating at least one word object, formed from one or more adjacent symbols within data defining an image, comprising the steps of:

(a) determining a skew angle corresponding to the orientation of the word object within the data defining the image;

(b) grouping adjacent symbols to form the word object, said adjacent symbols being distinguished from other symbols represented within the image by an intercharacter spacing which is less than a predefined distance; and (c) locating the boundaries of symbols grouped to the word object in step (b), in a coordinate system oriented with respect to the skew angle, thereby isolating the word object within the data defining the image.

15. The method of claim 14, wherein the step of grouping adjacent symbols to form the word object, includes the step of applying a median filter to the image, thereby causing all symbols separated from a neighboring symbol by a spacing smaller than the dimensions of the median filter mask to be recognized as adjacent symbols.

* * * * *